(12) United States Patent
Kameyama et al.

(10) Patent No.: US 10,728,356 B2
(45) Date of Patent: Jul. 28, 2020

(54) COMMUNICATION DEVICE AND COMMUNICATION SYSTEM

(71) Applicant: FUJITSU LIMITED, Kawasaki-shi, Kanagawa (JP)

(72) Inventors: Hiroaki Kameyama, Kawasaki (JP); Shinichi Sazawa, Atsugi (JP); Masayoshi Hashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/371,647

(22) Filed: Apr. 1, 2019

(65) Prior Publication Data

US 2019/0230184 A1    Jul. 25, 2019

Related U.S. Application Data

(63) Continuation of application No. PCT/JP2017/046640, filed on Dec. 26, 2017.

(30) Foreign Application Priority Data

Jan. 13, 2017   (JP) .................................. 2017-004340

(51) Int. Cl.
*H04L 29/08* (2006.01)
*H04L 29/02* (2006.01)
(Continued)

(52) U.S. Cl.
CPC .......... *H04L 67/2842* (2013.01); *G06F 13/00* (2013.01); *H04L 1/0041* (2013.01); *H04L 29/02* (2013.01); *H04L 47/32* (2013.01)

(58) Field of Classification Search
CPC ... H04L 67/2842; H04L 1/0041; H04L 29/02; H04L 47/32; G06F 13/00
See application file for complete search history.

(56) References Cited

U.S. PATENT DOCUMENTS

2003/0187923 A1* 10/2003 Kimura .................. H04L 29/06
                                                        709/203
2004/0111507 A1*  6/2004 Villado ............... H04L 43/0817
                                                        709/224
(Continued)

FOREIGN PATENT DOCUMENTS

JP         2007-299019      11/2007
JP         2009-205201       9/2009
(Continued)

OTHER PUBLICATIONS

International Search Report dated Apr. 3, 2018 in corresponding International Patent Application No. PCT/JP2017/046640.
(Continued)

*Primary Examiner* — Jenee Holland
(74) *Attorney, Agent, or Firm* — Staas & Halsey LLP

(57) ABSTRACT

A communication device includes a memory and a processor. The processor is configured to extract first division data from transmission data when transmitting the transmission data. The processor is configured to store, as held data, the first division data in the memory in association with first identification information that identifies the transmission data. The processor is configured to transmit, to a communication destination, a first transmission packet including the transmission data and information that identifies the held data to cause the communication destination to store second division data which is not included in the held data, among the transmission data in association with the first identification information. The processor is configured to transmit, when transmitting the transmission data after the transmission of the first transmission packet, a second transmission packet including the first identification information and the held data instead of the transmission data to the communication destination.

13 Claims, 17 Drawing Sheets

(51) Int. Cl.
*G06F 13/00* (2006.01)
*H04L 12/823* (2013.01)
*H04L 1/00* (2006.01)

(56) References Cited

U.S. PATENT DOCUMENTS

| | | | |
|---|---|---|---|
| 2007/0061451 A1* | 3/2007 | Villado | H04L 63/1408 709/224 |
| 2008/0114979 A1* | 5/2008 | Hsi | H04L 67/2842 713/161 |
| 2009/0073969 A1* | 3/2009 | Gobara | H04L 67/28 370/389 |
| 2009/0217091 A1 | 8/2009 | Miyamoto et al. | |
| 2014/0172795 A1 | 6/2014 | Teng | |
| 2015/0120666 A1 | 4/2015 | Otsuka | |
| 2015/0319794 A1* | 11/2015 | Long | H04L 67/288 370/329 |
| 2015/0358302 A1* | 12/2015 | Noguchi | H04L 67/2842 713/171 |
| 2018/0146073 A1 | 5/2018 | Kameyama et al. | |

FOREIGN PATENT DOCUMENTS

| | | |
|---|---|---|
| JP | 2012-79044 | 4/2012 |
| JP | 2015-82296 | 4/2015 |
| WO | WO 2016/181461 A1 | 11/2016 |

OTHER PUBLICATIONS

Written Opinion of the International Searching Authority dated Apr. 3, 2018 in corresponding International Patent Application No. PCT/JP2017/046640.

* cited by examiner

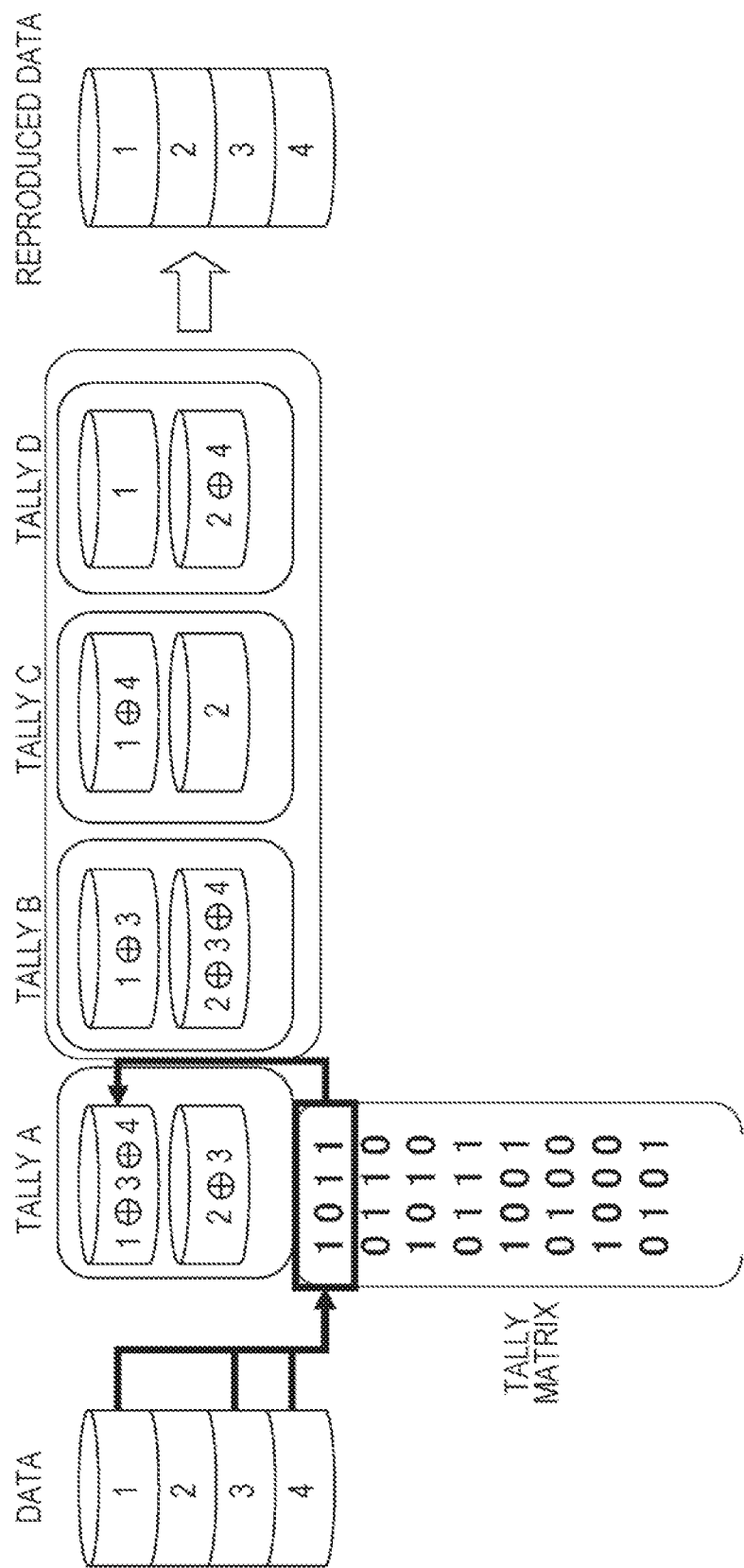

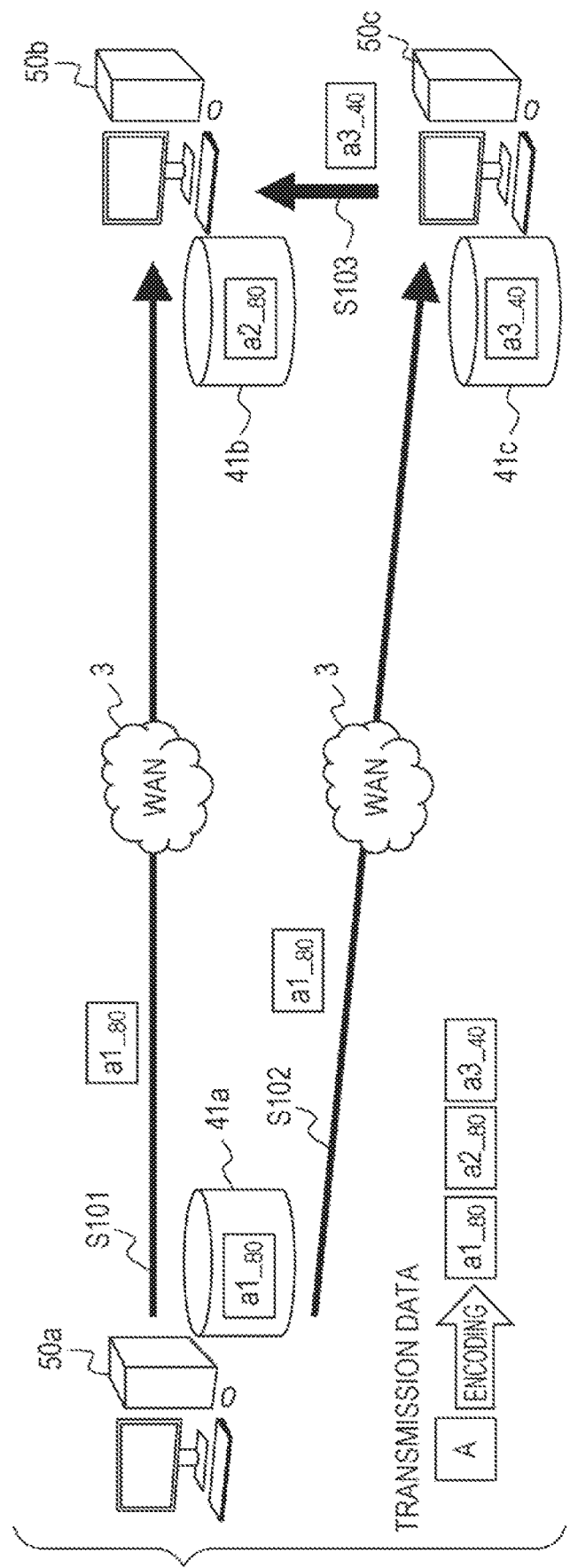

COMMUNICATION DEVICE AND COMMUNICATION SYSTEM

CROSS-REFERENCE TO RELATED APPLICATIONS

This application is a continuation application of International Application PCT/JP2017/046640 filed on Dec. 26, 2017 and designated the U.S., the entire contents of which are incorporated herein by reference. The International Application PCT/JP2017/046640 is based upon and claims the benefit of priority of the prior Japanese Patent Application No. 2017-004340, filed on Jan. 13, 2017, the entire contents of which are incorporated herein by reference.

FIELD

The embodiments discussed herein are related to a communication device and a communication system.

BACKGROUND

In recent years, high-speed communication is demanded, and various attempts have been made to achieve a high communication speed. For instance, in order to reduce the amount of data transmission, deduplication may be performed on the target data (transmission target data) to be transmitted. In the deduplication, a receiving-side transfer device holds, in association with an identifier, data received in the past from a transmitting-side transfer device. The transmitting-side transfer device also holds, in association with an identifier, data transmitted in the past. The transmitting-side transfer device determines whether part or all of the transmission target data is already transmitted. For the data already transmitted, instead of actual data, an identifier associated with the data is transmitted to the receiving-side transfer device. The receiving-side transfer device reads data held in association with a received identifier, and handles the read data as the data transmitted from the transmitting-side transfer device.

FIG. 1 is a diagram illustrating an example of deduplication. In the system illustrated in FIG. 1, a terminal 10a and a terminal 10b communicate with each other via a transfer device 5a and a transfer device 5b. The terminal 10a is connected to the transfer device 5a, and the terminal 10b is connected to the transfer device 5b. The transfer device 5a and the transfer device 5b communicate with each other via a wide area network (WAN) 3.

For instance, assume that the terminal 10a transmits data A to the terminal 10b. In this case, the terminal 10a transmits the data A to the transfer device 5a (arrow A1). The transfer device 5a determines whether transmission data received from the terminal 10a is data transmitted in the past. When the data transmitted from terminal 10a is relatively large, the transfer device 5a divides the received data into multiple pieces of data as appropriate, and identifies the data transmitted in the past, and the data included in the transmission data multiple times. In the example of FIG. 1, communications using data A, data B, and data C are already performed in the past between the transfer device 5a and the transfer devices 5b. Thus, each of the transfer device 5a and the transfer device 5b holds the data A, data B, data C in cache 6 (6a, 6b) each in association with an identifier that identifies each data. For instance, it is assumed that each of the transfer device 5a and the transfer device 5b holds the data A in association with an identifier "a". Similarly, it is assumed that data B is associated with an identifier "b" and data C is associated with an identifier "c".

In the example of FIG. 1, transmission data is the data A. Thus, instead of the data A, the transfer device 5a transmits the identifier "a" associated with the data A to the terminal 10b (arrow A2). Thus, the identifier "a" arrives at the transfer device 5b as data addressed to the terminal 10b (arrow A3). The transfer device 5b then refers to the cache 6b, obtains data A associated with identifier "a", and transmits the data A to the terminal 10b as the data transmitted from the terminal 10a (arrow A4).

As related art, a relay device is known which, from among data received from a first device, extracts a duplicated pattern which overlaps with data received from the first device in the past, replaces the duplicated pattern with an identifier associated with the duplicated pattern, and transfers the identifier to a second device. A server is also proposed, which, when data is transmitted, transmits difference data with cache data and an identifier of the cache data.

Related techniques are disclosed in, for example, Japanese Laid-open Patent Publication No. 2015-82296 and Japanese Laid-open Patent Publication No. 2007-299019.

When deduplication is performed in bidirectional communication, data once transmitted from one of the transmitting-side transfer device and the receiving-side transfer device is held in both the transmitting-side transfer device and the receiving-side transfer device. Therefore, in the overall network, the capacity equivalent to the product of the volume of data for deduplication and the number of transfer devices is used for communication using deduplication, and thus the utilization efficiency of the caches provided in the devices included the network is low.

SUMMARY

According to an aspect of the present invention, provided is a communication device including a memory and a processor coupled to the memory. The processor is configured to extract first division data from transmission data when transmitting the transmission data. The processor is configured to store, as held data, the first division data in the memory in association with first identification information that identifies the transmission data. The processor is configured to transmit, to a communication destination, a first transmission packet including the transmission data and information that identifies the held data to cause the communication destination to store second division data which is not included in the held data, among the transmission data in association with the first identification information. The processor is configured to transmit, when transmitting the transmission data after the transmission of the first transmission packet, a second transmission packet including the first identification information and the held data instead of the transmission data to the communication destination.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 17 is a diagram illustrating an example of a method of generating tally information using erasure correction; and FIG. 18 is a diagram illustrating an example of communication processing performed by three communication devices.

DESCRIPTION OF EMBODIMENTS

Figure 1:
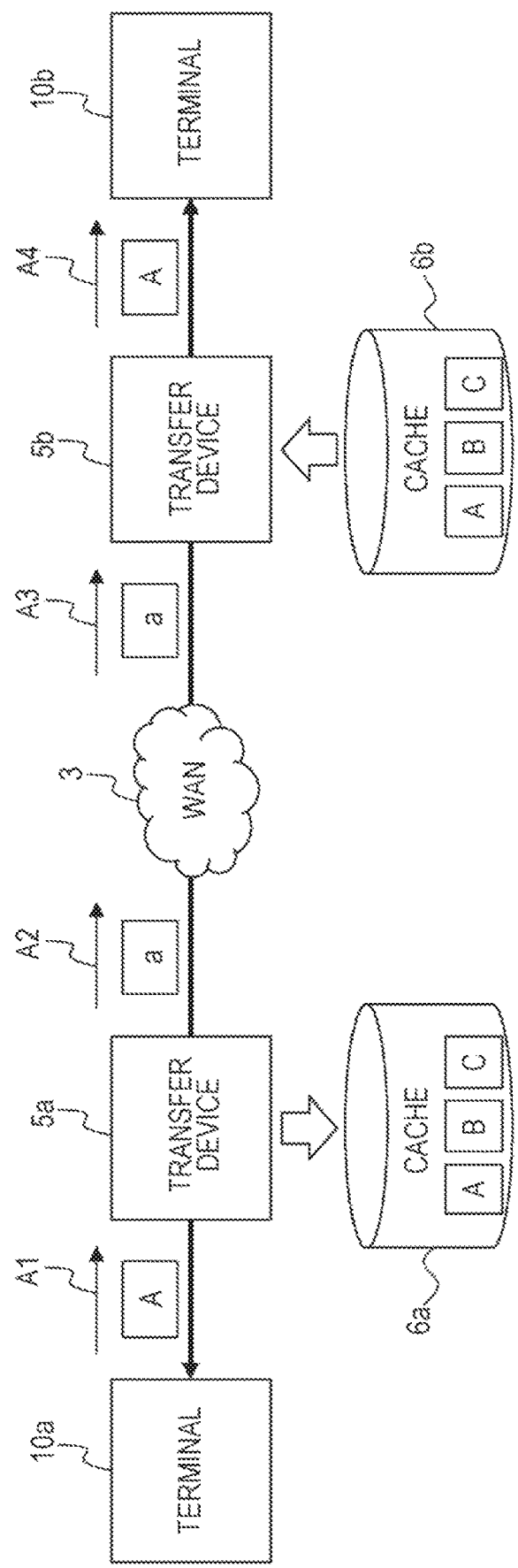
FIG. 1 is a diagram illustrating an example of deduplication.
Figure 2:
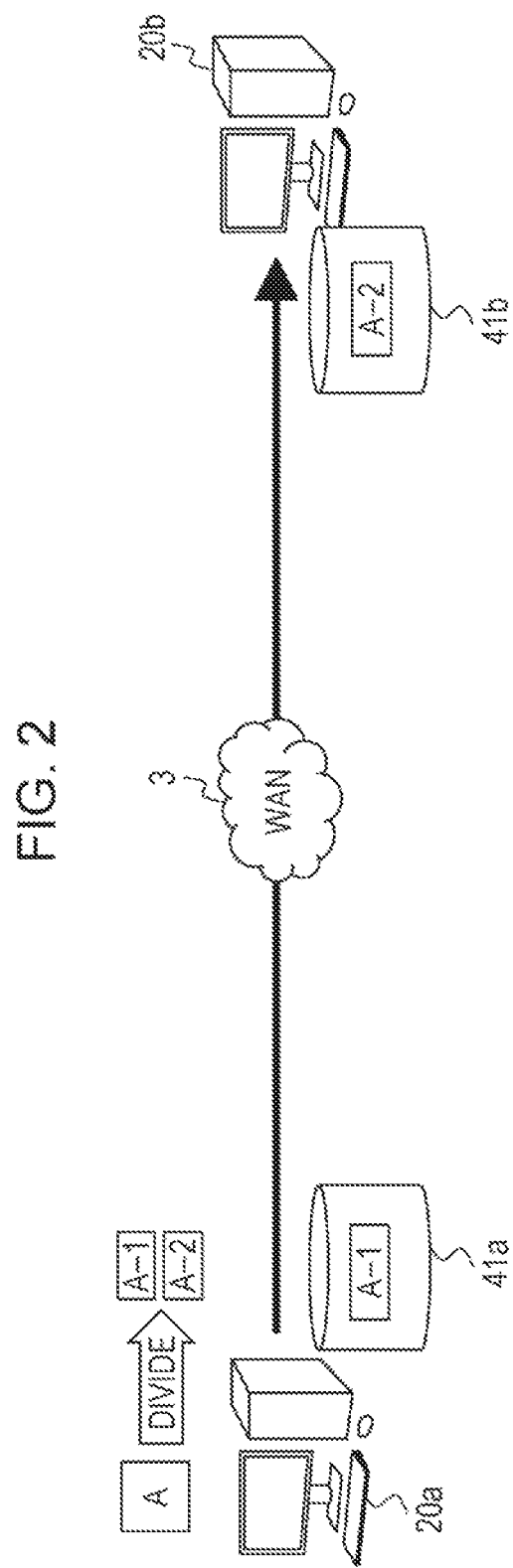
FIG. 2 is a diagram illustrating an example of a communication method according to an embodiment.

FIG. 2 is a diagram illustrating an example of a communication method according to an embodiment. In the method according to the embodiment, a communication device 20 which attempts to transmit data divides the transmission target data into the data to be held in a cache of the communication device itself and the data to be held in the communication device 20 at a transfer destination. Each communication device 20 holds the data to be held in the communication device itself in association with identification information by which data before division is uniquely identifiable. In the following description, information obtained from the data before division is used as the identification information (index) of the data before division. As long as a method of calculating identification information is shared between the data transmitting-side and the data receiving-side, the method may be set to any known method.

For example, in the example of FIG. 2, a communication device 20a communicates with a communication device 20b via the WAN 3. It is assumed that the communication device 20a tries to transmit data A to the communication device 20b for the first time. Here, the communication device 20a divides the data A into division data A-1 and division data A-2. The communication device 20a stores the division data A-1 in a cache 41a of the communication device 20a in association with the identification information of the data A.

The communication device 20a transmits the data A to the communication device 20b along with information for identifying division data A-1, which is held in the communication device 20a, among the data A. For example, the communication device 20a may use information on the address indicating the part of the data A (which corresponds to the division data A-1), the ratio from the head of data A, or the number of bits from the head of data A as the information for identifying the division data A-1.

It is assumed that the data A and information for identifying the division data A-1 arrive at the communication device 20b. The communication device 20b then records the identification information of the data A in a cache 41b of the communication device 20b along with data (division data A-2), which is obtained by excluding the data corresponding to the part identified by the information for identifying the division data A-1 from the data A.

Subsequently, when the communication device 20a attempts to transmit the data A to the communication device 20b, the communication device 20a transmits a combination of the identification information of the data A and the division data A-1 to the communication device 20b. The communication device 20b then reproduces the data A using the division data A-2 held in association with the identification information of the data A and the division data A-1 received from the communication device 20a.

In contrast, when the communication device 20b attempts to transmit the data A to the communication device 20a, the communication device 20b transmits a combination of the identification information of the data A and the division data A-2 to the communication device 20a. The communication device 20a then reproduces the data A using the division data A-1 held in association with the identification information of the data A and the division data A-2 received from the communication device 20b.

In this manner, in the method according to the embodiment, cache data used for transfer processing of the data A is divided and held so as to be complementary between the communication device 20a and the communication device 20b. When the division data A-1 held in the communication device 20a and the division data A-2 held in the communication device 20b are combined, the total volume is substantially the same as the volume of the data A. Thus, with the method according to the embodiment, it is possible to perform deduplication processing while using the caches of the communication devices 20 in the network efficiently.

FIG. 2 illustrates an example in which the communication device 20a and the communication device 20b directly communicate with each other. However, the communication method illustrated in FIG. 2 may be used even when each of the communication device 20a and the communication device 20b transfers data which is already received from another device.

<Device Configuration>

Figure 3:
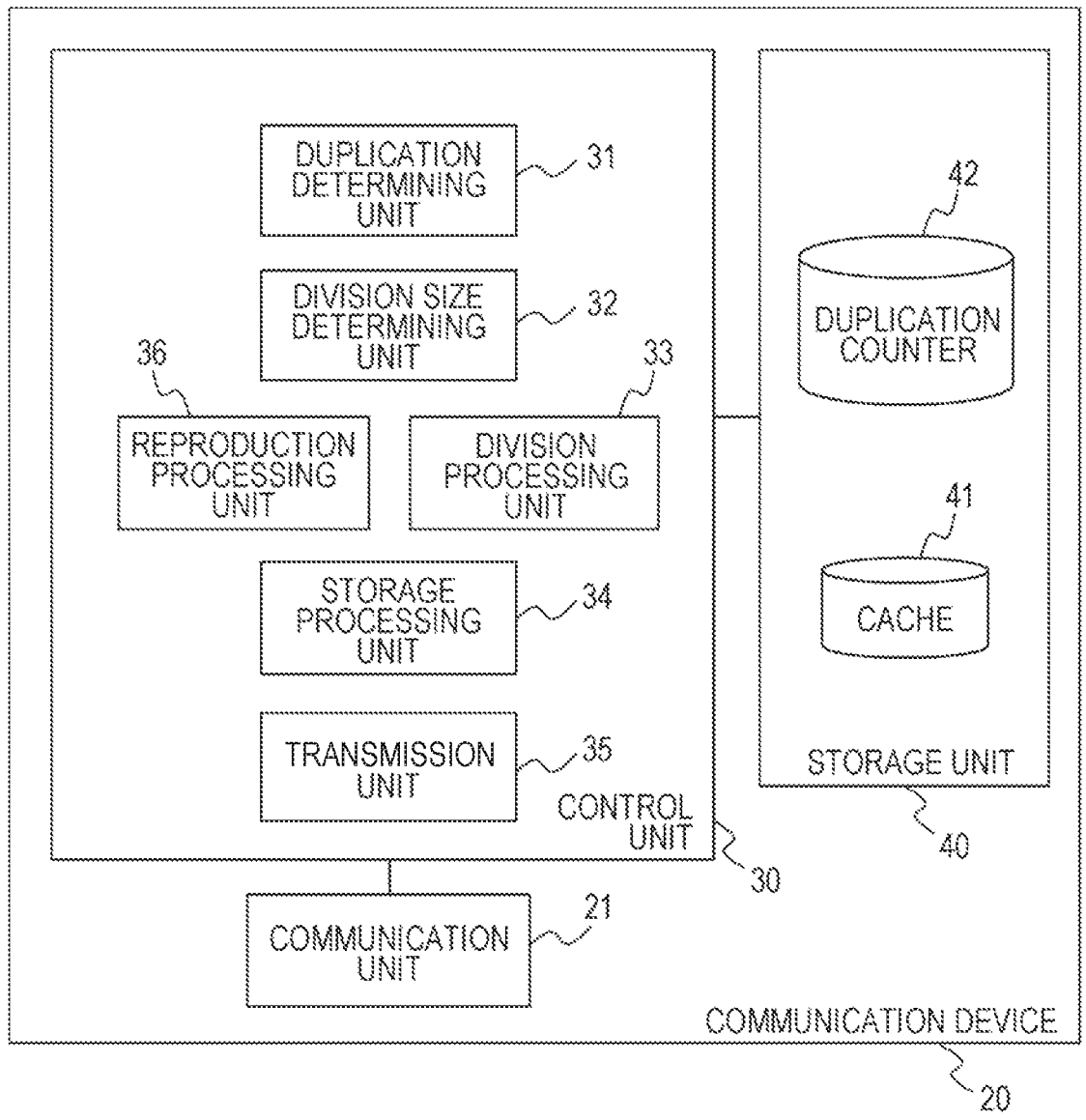
FIG. 3 is a diagram illustrating an exemplary configuration of a communication device according to an embodiment.

FIG. 3 is a diagram illustrating an exemplary configuration of the communication device 20. The communication device 20 includes a communication unit 21, a control unit 30, and a storage unit 40. The control unit 30 includes a duplication determining unit 31, a division size determining unit 32, a division processing unit 33, a storage processing unit 34, a transmission unit 35, and a reproduction processing unit 36. The storage unit 40 serves as a cache 41. The storage unit 40 may include a duplication counter 42.

In the cache 41, identification information of transmission target data, a part of data identified by the identification information, and information indicating which part of the data identified by the identification information is held are recorded. In the duplication counter 42, the number of transmission processing of the transmission target data is recorded in association with the transmission target data or the identification information of the transmission target data. When a communication device 20 communicates with multiple communication devices 20, the cache 41 and the duplication counter 42 may be generated for each of the communication devices 20 (destination communication devices 20) serving as communication destinations in association with information for identifying each of the destination communication devices 20. Examples of the cache 41 and the duplication counter 42 will be described later.

The communication unit 21 transmits and receives a packet to and from a terminal 10 connected to the communication device 20 and another communication device 20 in the network. The duplication determining unit 31 determines whether the transmission target data is already transmitted or received in the past based on whether or not the identification information of the transmission target data is held in the cache 41. The division size determining unit 32 determines the size of division data in order to hold the transmission target data in multiple communication devices 20. The division processing unit 33 divides the transmission target data in accordance with the size determined by the division size determining unit 32, thereby generating division data. The transmission unit 35 determines the transmission target data to be transmitted to the destination communication device 20. The storage processing unit 34 updates the cache 41 as appropriate by recording, in the cache 41, the division data to be held in the communication device itself and information identifying a part corresponding to the division data in the data before division. The reproduction processing unit 36 reproduces the data transmitted by the transmission source by using the data in a packet received from another communication device 20 and the data recorded on the cache 41.

Figure 4:
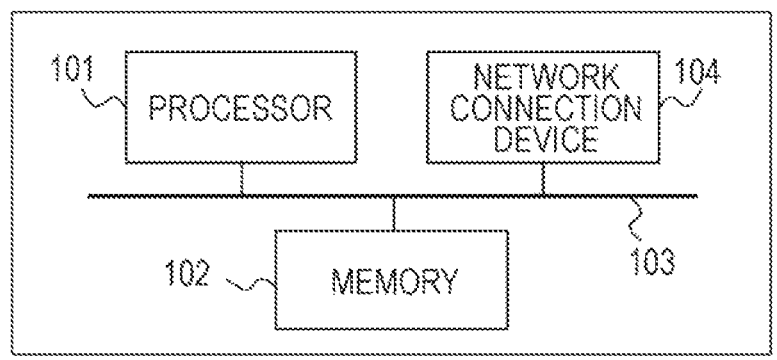
FIG. 4 is a diagram illustrating an exemplary hardware configuration of a communication device according to an embodiment.

FIG. 4 is a diagram illustrating an exemplary hardware configuration of the communication device 20. The communication device 20 includes a processor 101, a memory 102, a bus 103, and a network connection device 104. The processor 101 may be any processing circuit, for example, a central processing unit (CPU). The processor 101 performs various types of processing by executing a program while using the memory 102 as a working memory. The memory 102 includes a random access memory (RAM), and also includes a non-volatile memory such as a read-only memory (ROM). The memory 102 is used as a storage of a program and data used for processing by the processor 101. The network connection device 104 is used for communication with other devices via a network. A bus 103 connects the processor 101, the memory 102, and the network connection device 104 to allow input/output of data.

The processor 101 serves as the control unit 30, and the memory 102 serves as the storage unit 40. The network connection device 104 serves as the communication unit 21. Although not illustrated in FIG. 4, the communication device 20 may further include an input device for an operator to input an instruction, and a display device for displaying information held in the communication device 20 so as to be visually recognized by an operator. The input device is, for example, a keyboard, and the display device is, for example, a display.

First Embodiment

Figure 5:
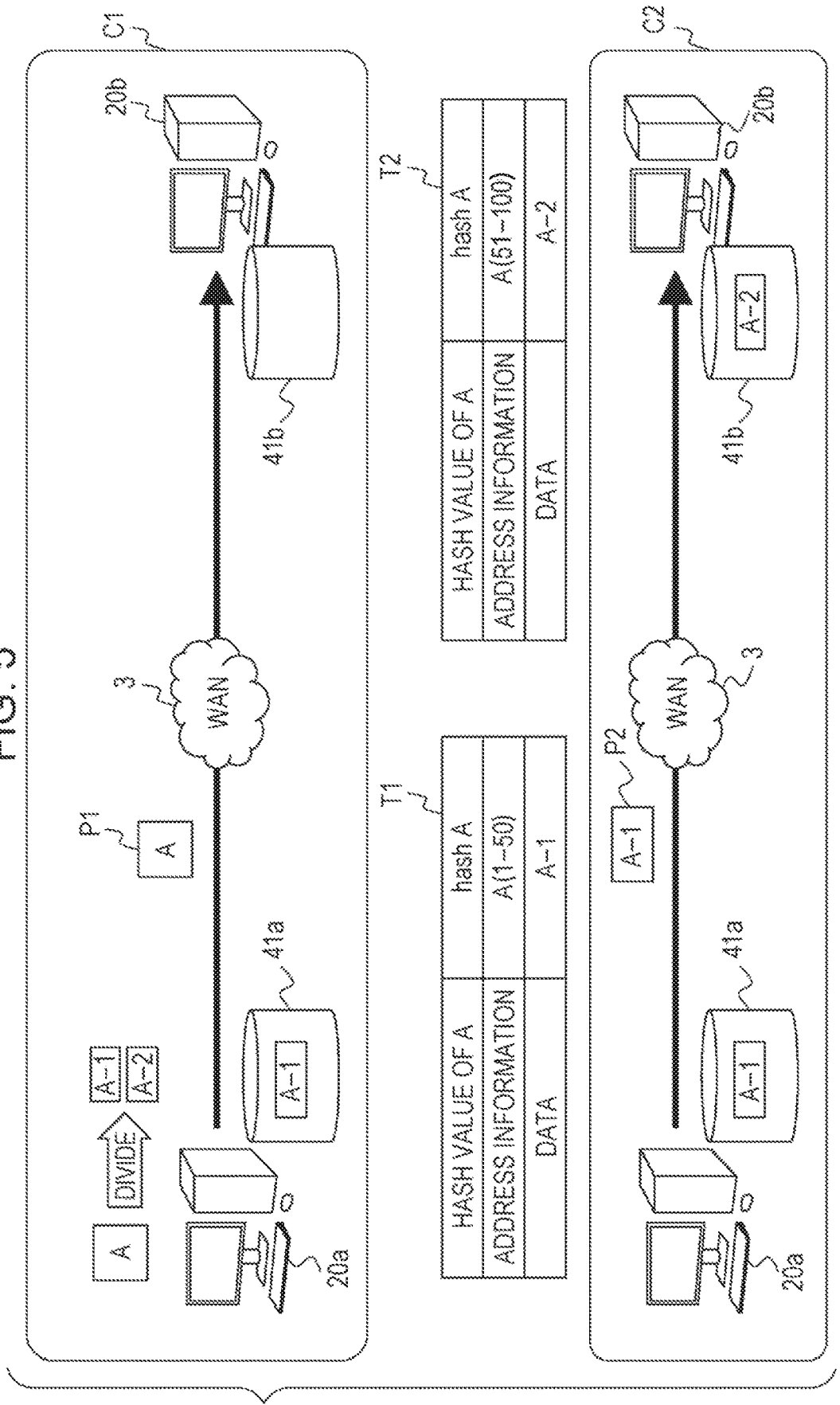
FIG. 5 is a diagram illustrating an example of a communication method according to a first embodiment.

FIG. 5 is a diagram illustrating an example of a communication method according to a first embodiment. Also in FIG. 5, an example will be described in which the communication device 20a transmits the data A to the communication device 20b. In the following description, in order to make it clear which communication device 20 is being described, after the symbol of a component, an alphabet of the last letter of the symbol of the communication device 20 may be added. For example, a duplication determining unit 31a is the duplication determining unit 31 in the communication device 20a. In the following description, a hash value is used as the identification information that identifies the transmission target data. As long as a hash function used for calculation of a hash value is shared between the communication device 20a and the communication device 20b, any known hash function may be used.

Case C1 is an example of processing when the communication device 20a transmits data A to the communication device 20b for the first time. First, the duplication determining unit 31a refers to a cache 41a to determine whether the data A is already transmitted from the communication device 20a. At this time, it is assumed that a hash value of the data A is not included in the cache 41a. The duplication determining unit 31a then determines that the data A does not overlap with the data transmitted from the communication device 20a in the past. A division size determining unit 32a determines the size of division data to be generated from the data A. Here, it is assumed that the division size determining unit 32a determines that the data A is divided into two: 50% each. The division processing unit 33a sets division data A-1 be the early 50% of the data A, and division data A-2 be the late 50% of the data A.

In the example of FIG. 5, it is assumed that a transmission unit 35a determines the division data A-1 as the data to be held in the communication device 20a, and the division data A-2 as the data to be held in the communication device 20b. A storage processing unit 34a then records the division data A-1 in the cache 41a along with a hash value obtained from the data A and address information of the division data A-1. A table T1 of FIG. 5 illustrates an example of information on the division data A-1 among the information recorded in the cache 41a. In the example of table T1, the hash value of the data A is hashA. The address information indicates which part of the data A corresponds to the division data A-1. In FIG. 5, the early 50% of the data A before division is denoted by A(1-50). The storage processing unit 34a also stores the division data A-1 in the cache 41a.

Since the current transmission processing is transmission of the data A to the communication device 20b for the first time, the transmission unit 35a determines the data A before division and information held in the communication device 20a for identifying the division data A-1 as the transmission target data to be transmitted to the communication device 20b. The transmission unit 35a generates a packet P1 including the transmission target data A, and transmits the packet P1 to the communication device 20b via a communication unit 21a. Thus, as illustrated in the case C1, the data A is transmitted from the communication device 20a to the communication device 20b.

A communication unit 21b of the communication device 20b receives the packet P1. A reproduction processing unit 36b determines whether the identification information for identifying the transmission data is included in the packet P1. Here, it is assumed that a hash value is not included in the packet P1. The reproduction processing unit 36b then ends the processing without performing reproduction for the data included in the packet P1.

A storage processing unit 34b obtains information that identifies the part corresponding to the division data A-1 held in the communication device 20a among the data A transmitted by the packet P1. The storage processing unit 34b recognizes the part corresponding to division data not held in the communication device 20a, among the data A included in the packet P1, as the part corresponding to division data to be held in the communication device 20b. In the example of FIG. 5, the early 50% (A(1-50)) of the data A is held in the communication device 20a, thus the storage processing unit 34b recognizes that it is requested that the late 50% (A(51-100)) of the data A be held in the communication device 20b. Thus, the storage processing unit 34b stores the late 50% of the data A in the cache 41b in association with information on an address that indicates a part corresponding to the division data A-2. The storage processing unit 34b calculates the hash value (hashA) of the data A, and records the obtained value in the cache 41b in association with the division data A-2. Thus, when processing of the packet P1 is completed, the communication device 20b includes the information illustrated in table T2 in the cache 41b.

Case C2 is an example of processing when the communication device 20a transmits the data A again to the communication device 20b. The duplication determining unit 31a determines whether the hash value (hashA) of data A is included in the cache 41a. At the time of case C2, as illustrated in table T1, the hash value of the data A is included in the cache 41a. Thus, the duplication determining unit 31a determines that the data A is already transmitted to the communication device 20b in the past.

The transmission unit 35a refers to the cache 41a and determines that the hash value (hashA) of the data A and the division data A-1 associated with the hashA as the transmission target data to be transmitted from the communication device 20a to the communication device 20b instead of the data A. The transmission unit 35a generates a packet P2 including the hash value of the data A and the division data A-1 to be transmitted, and transmits the packet P2 to the communication device 20b via the communication unit 21a. Thus, as illustrated in case C2, the division data A-1 is transmitted from the communication device 20a to the communication device 20b.

The communication unit 21b of the communication device 20b receives the packet P2. Since the hash value of the data A is included in the packet P2 as the identification information for identifying the transmission data, the reproduction processing unit 36b recognizes the data included in the packet P2 as the data for which reproduction is to be performed. As illustrated in table T2, the cache 41b holds the division data A-2 in association with the hash value (hashA) of the data A. The reproduction processing unit 36b reproduces the data A using the division data A-1 in the packet P2 and the division data A-2 held in the cache 41b. During the reproduction processing, the reproduction processing unit 36 may use the address information of the division data A-2 recorded in the cache 41b as appropriate. Thus, as illustrated in case C2, the communication device 20a transmits the division data A-1 along with the hash value of the data A to the communication device 20b, thereby making it possible for the communication device 20b to reproduce the data A which is the original transmission data.

In FIG. 5, the case has been described where the data A is transmitted from the communication device 20a to the communication device 20b. However, similar processing may be performed in the case where the data A is transmitted from the communication device 20b to the communication device 20a. For example, when the communication device 20b transmits the data A to communication device 20a, a duplication determining unit 31b determines that the communication device 20b has transmitted and received the data A, based on the cache 41b (table T2). The reproduction processing unit 36b then determines based on the cache 41b that the hash value (hashA) of the data A and the division data A-2 in association with the hashA are the transmission target data instead of the data A. Consequently, a packet including the hash value of the data A and the division data A-2 is transmitted from the communication device 20b to the communication device 20a. In the communication device 20a, a reproduction processing unit 36a refers to the cache 41a (table T1), and may reproduce the transmission data A from the division data A-1 held in the cache 41a and the division data A-2 in the received packet.

Although an example has been described with reference to FIG. 5 where the transmission target data is transmitted by the packets P1 and P2, FIG. 5 is an example. The transmission target data may be transmitted and received using any numbers of packets.

Figure 6:
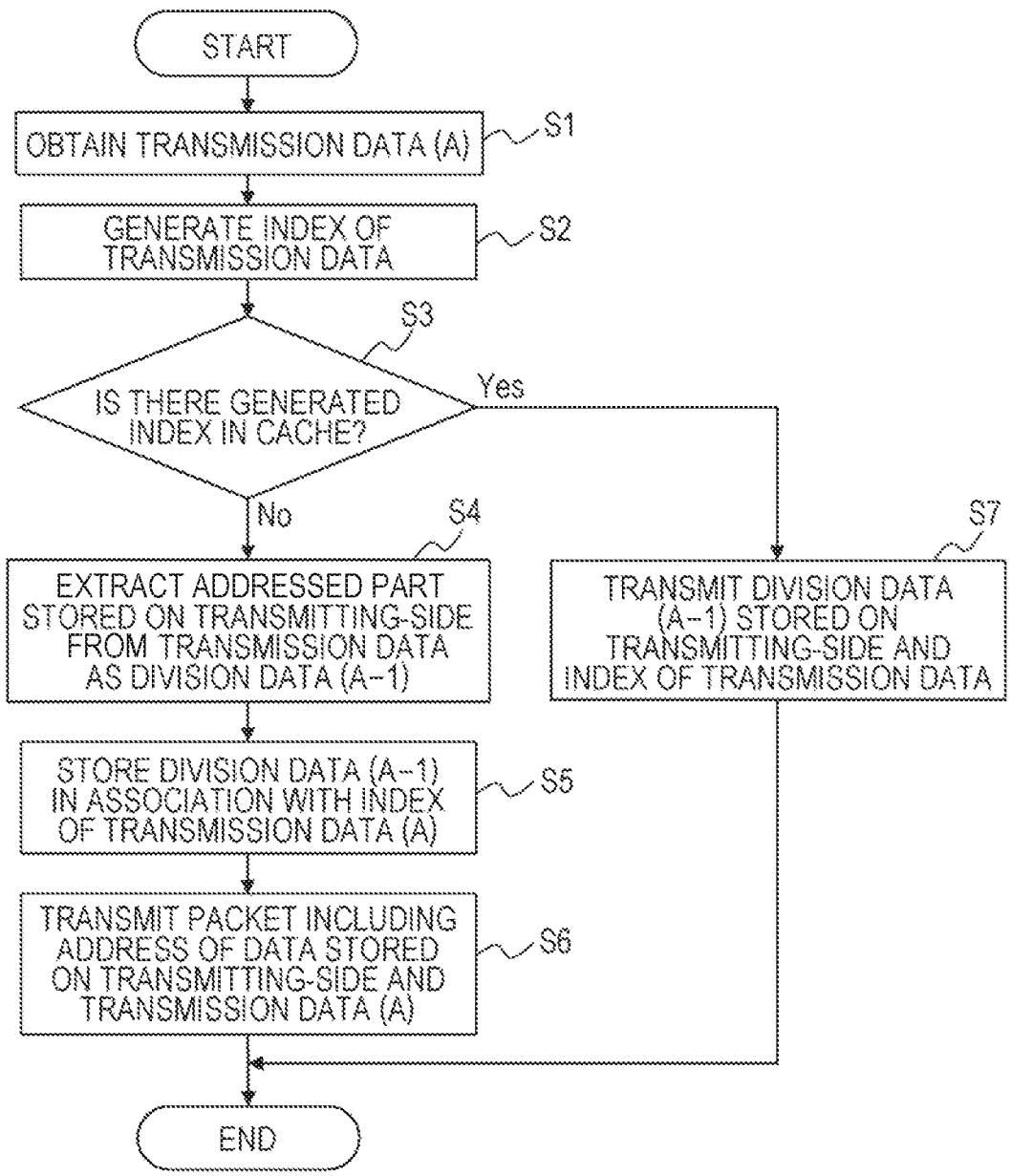
FIG. 6 is a flowchart illustrating an example of a transmission process.

FIG. 6 is a flowchart illustrating an example of a transmission process. In the example of FIG. 6, an index is used when transmission target data is identified. The index is a value, such as a hash value of transmission target data, which is calculated from the transmission target data by the communication devices 20 on both the transmitting-side and the receiving-side. The index is a value by which transmission target data is identified.

First, the duplication determining unit 31 obtains transmission data A (step S1). When the communication device 20 itself processes an application, the duplication determining unit 31 may obtain transmission data A generated in the processing by the communication device 20. When the terminal 10 is connected to the communication device 20 and an application is running on the terminal 10, the duplication determining unit 31 may obtain transmission data A from the terminal 10. The duplication determining unit 31 generates an index used for identification of the transmission data A (step S2). The duplication determining unit 31 determines whether the generated index is present in the cache 41 (step S3).

When the index is not present in the cache 41, the storage processing unit 34 extracts, from the transmission data, a part corresponding to the storage address of the communication device 20 on the transmitting-side, as the division data A-1 (No in step S3, step S4). The storage processing unit 34 stores the extracted division data A-1 in the cache 41 in association with the index of the transmission data A (step S5). The transmission unit 35 generates a packet including the address of data held in the communication device 20 on the transmitting-side and the transmission data A, and transmits the packet via the communication unit 21 (step S6).

When the index is present in the cache 41, the transmission unit 35 generates a packet including the address of the division data A-1 held in the communication device 20 on the transmitting-side and the index of the transmission data A, and transmits the packet via the communication unit 21 (Yes in step S3, step S7).

Figure 7:
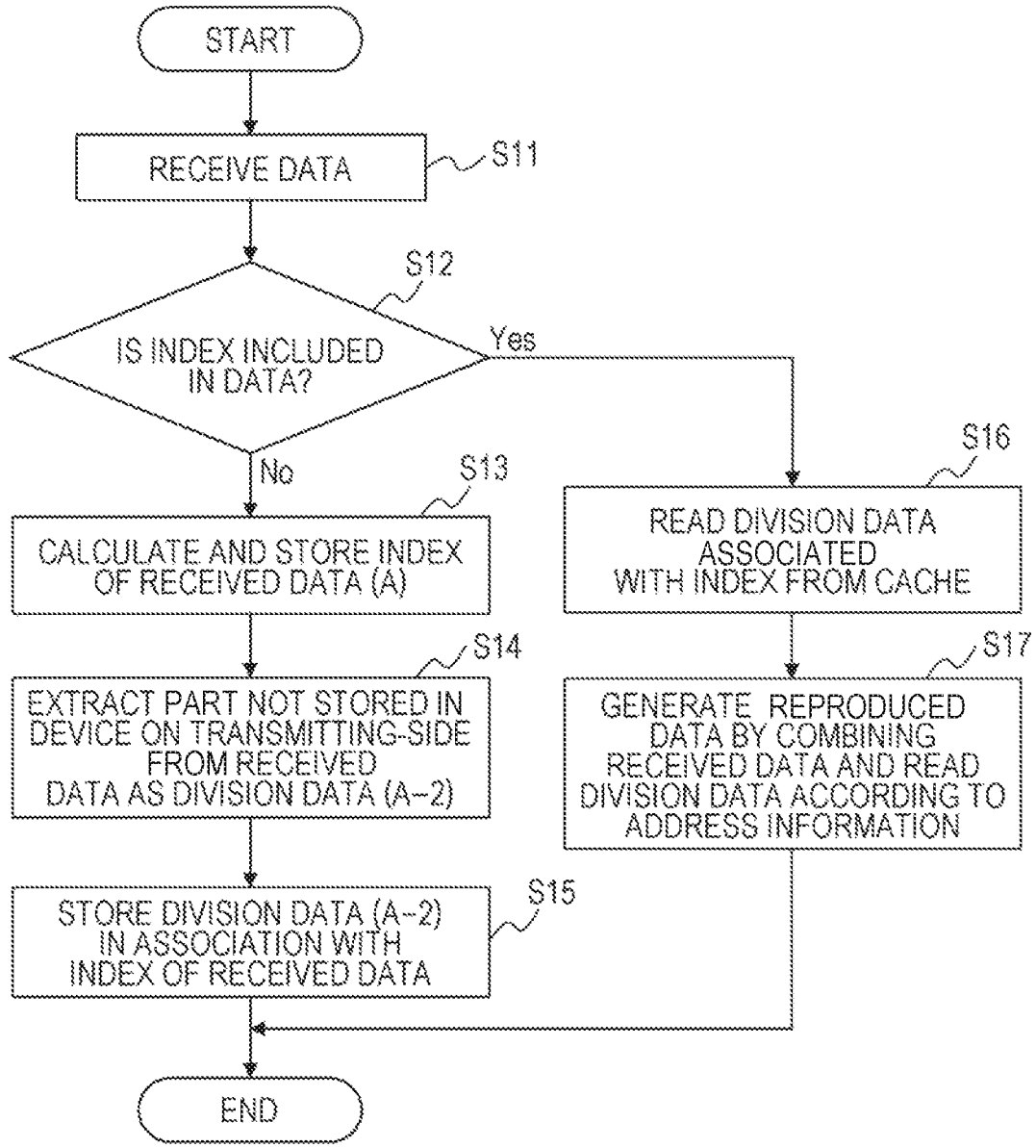
FIG. 7 is a flowchart illustrating an example of a reception process.

FIG. 7 is a flowchart illustrating an example of reception process. Also in FIG. 7, the index used for identification of transmission target data is a value, such as a hash value of the transmission target data, which is calculated from the transmission target data by the communication devices 20 on both the transmitting-side and the receiving-side, and the index is a value by which transmission target data is identified.

The communication unit 21 receives data (step S11). The reproduction processing unit 36 determines whether an index is included in the received data (step S12). When no index is included in the received data, the storage processing unit 34 calculates and holds an index used for identification of the received data A (No in step S12, step S13). The storage processing unit 34 extracts, as the division data A-2, data corresponding to the part not held in the communication device 20 on the transmitting-side from the received data (step S14). The storage processing unit 34 stores the extracted division data A-2 in the cache 41 in association with the index of the received data A (step S15).

When an index is included in the received data, the reproduction processing unit 36 reads the division data associated with the index from the cache 41 (Yes in step S12, step S16). The reproduction processing unit 36 generates reproduced data by combining the received data and the read division data in accordance with the address information (step S17). After reproduced data is generated, the reproduced data is processed in accordance with implementation. When the communication device 20 itself processes an application, the reproduction processing unit 36 outputs reproduced data to an application processing unit (not illustrated) in the communication device 20, and causes the application processing unit to process the reproduced data. When the terminal 10 is connected to the communication device 20 and an application is running on the terminal 10, the reproduction processing unit 36 transmits the reproduced data to the terminal 10 via the communication unit 21.

In this manner, in the method according to the embodiment, cache data used for transfer processing of transmission target data is divided and held in the communication device 20 on the transmitting-side and the communication device 20 on the receiving-side, and is reduced to a substantially same degree as the volume of the transmission target data itself. Thus, with the method according to the embodiment, deduplication processing may be performed while using the caches of the communication devices 20 in the network efficiently.

Although an example has been described where the communication device 20 on the transmitting-side and the communication device 20 on the receiving-side hold a similar amount of data in the above description, this is an example. A ratio of the data held in the communication device 20 on the transmitting-side and the communication device 20 on the receiving-side may be changed in any manner depending on implementation. For instance, when the capacity of the cache 41 included in the communication device 20 on the transmitting-side is smaller than the capacity of the cache 41 included in the communication device 20 on the receiving-side, the communication device 20 on the transmitting-side may be set such that the amount of data held in the communication device 20 on the transmitting-side among the transmission target data is reduced.

Second Embodiment

In a second embodiment, an example will be described where a ratio of the data held in the communication devices 20 among the transmission target data is changed. In the second embodiment, each communication device 20 includes the duplication counter 42. In the second embodiment, when communication is established between a transmission source communication device 20 and a transmission destination communication device 20, the transmission source communication device 20 obtains the maximum value of data storable in the transmission destination communication device 20.

Figure 8:
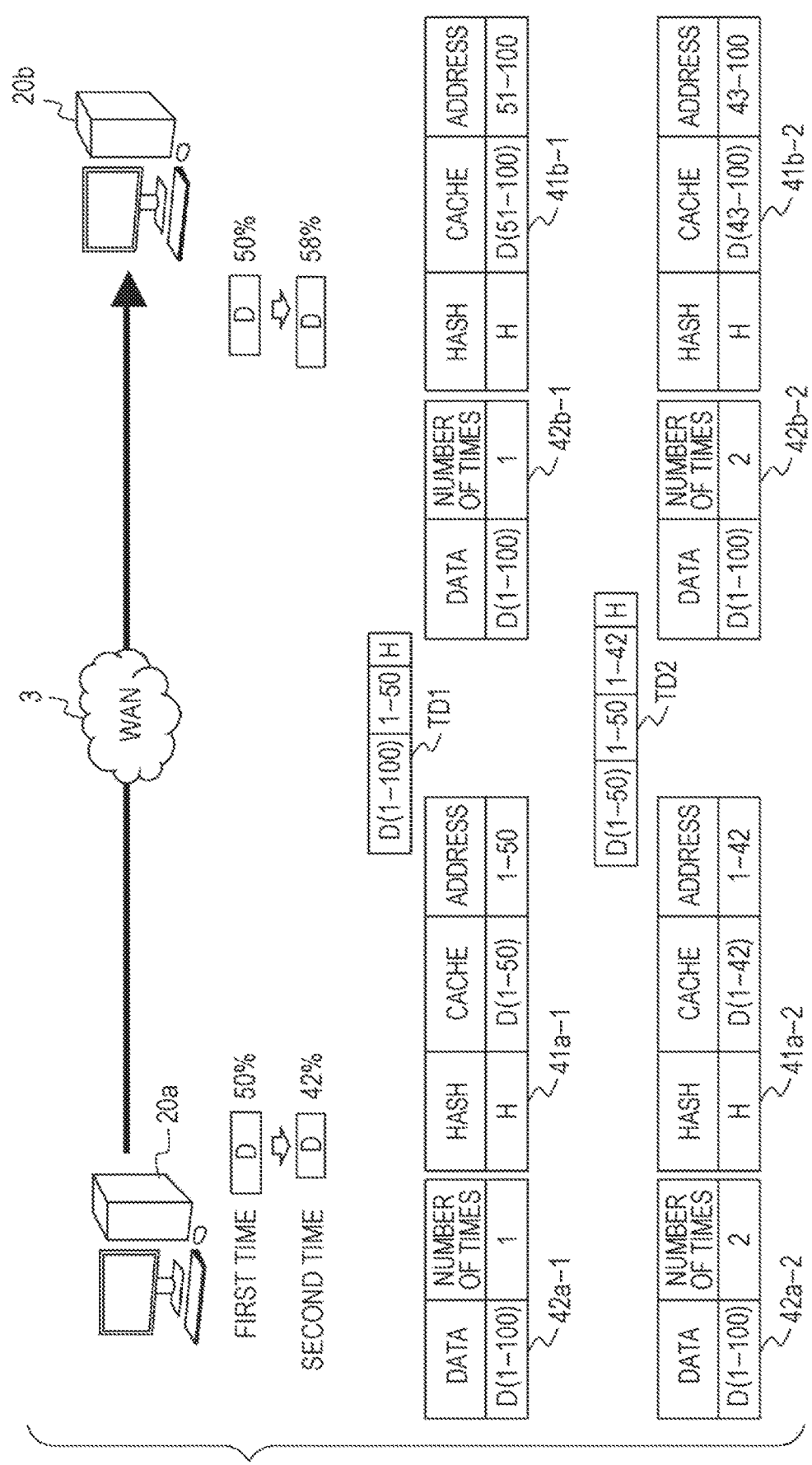
FIG. 8 is a diagram illustrating an example of a communication method according to a second embodiment.
Figure 9:
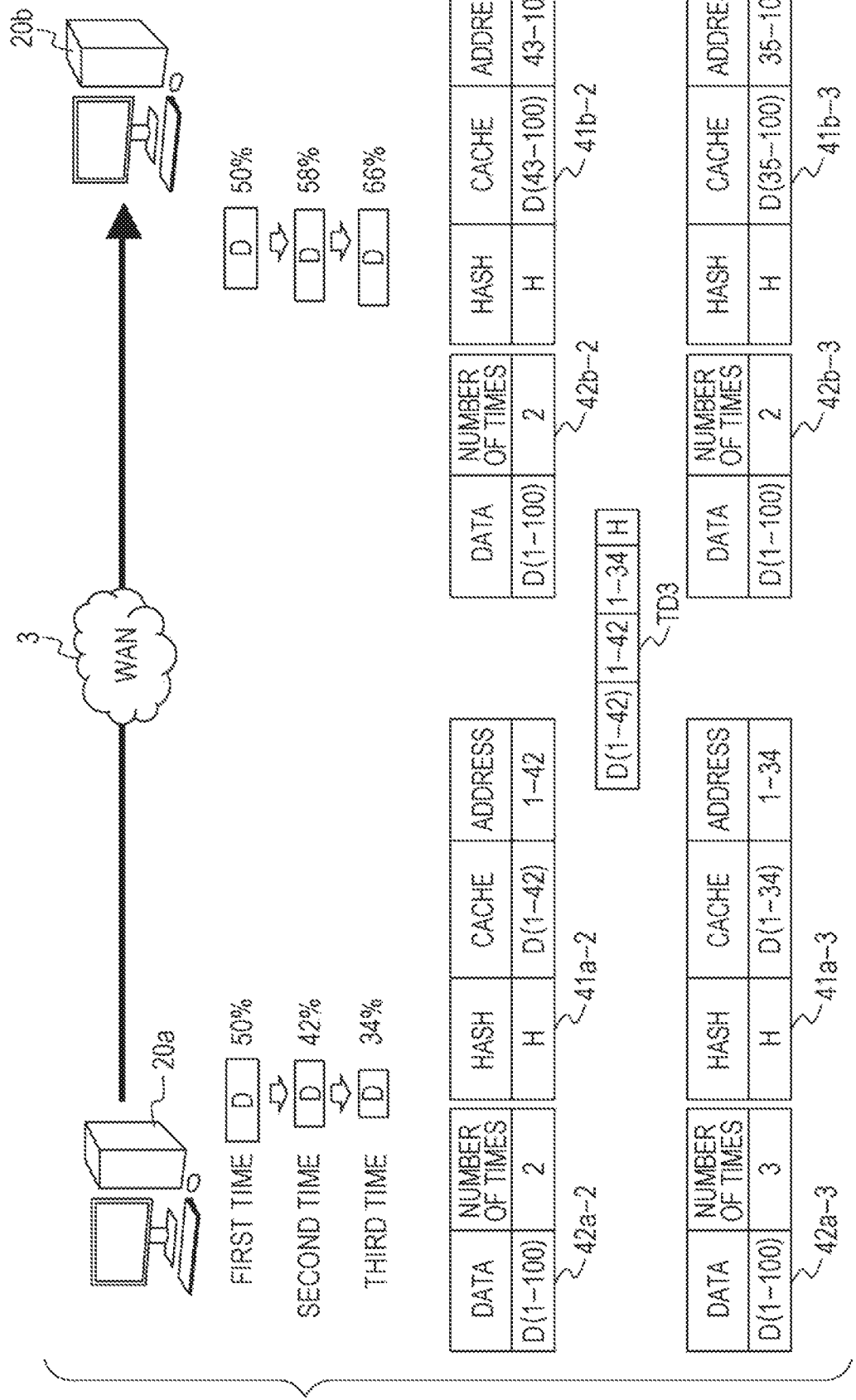
FIG. 9 is a diagram illustrating an example of a communication method according to the second embodiment.

FIGS. 8 and 9 are diagrams illustrating an example of a communication method according to the second embodiment. Hereinafter, the details of transmission process and data held in each communication device 20 when data D (also denoted by D(1-100)) is transmitted multiple times from the communication device 20a to the communication device 20b will be described separately for the number of transmission processing with reference to FIGS. 8 and 9. In the following, an example will be described where the data volume held in each communication device 20 is optimized by performing the transmission process three times. It is assumed that the division size determining unit 32 included in each communication device 20 holds, in advance, the number of transmission processing used for adjustment of the volume of data to be held. Also, in the following description, let H denote the hash value of data D.

(1) First Data Transmission

It is assumed that the duplication determining unit 31a determines that the hash value of data D is not recorded in the cache 41a. The division size determining unit 32a then determines the size of the data held in the communication device 20a and the size of the data held in the communication device 20b for the first transmission processing. In the example of FIG. 8, the division size determining unit 32a is assumed to determine that the communication device 20a holds the early 50% of the data D, and the communication device 20b holds the late 50% of the data D for the first transmission processing. The division processing unit 33a then divides the data D into division data D(1-50) and division data D(51-100). The division data D(1-50) is the early 50% of the data D, and the division data D(51-100) is the late 50% of the data D.

The storage processing unit 34a records the number of transmission processing of the data D in a duplication counter 42a. As illustrated in a duplication counter 42a-1 of FIG. 8, in the duplication counter 42, the number of transmission processing of data may be recorded in association with the data. The number of transmission processing of data may be recorded in association with the hash value of the data.

The storage processing unit 34a further stores the data to be held in the communication device 20a among the data D in the cache 41a. The cache 41 includes the hash value of the data before division, the data to be held, and the address information of the data to be held. Thus, the information indicated by cache 41a-1 is held in the cache 41a of the communication device 20a by the processing of the storage processing unit 34a. For example, H is recorded in the cache 41a as the hash value of the data D, and cache target data is the division data D(1-50), which is the early 50% of the data D. Also, information (1-50) indicating the early 50% is recorded as information on address.

Since the data D is transmitted to the communication device 20b for the first time, the transmission unit 35a determines that the entire data D is to be transmitted. The address of data held in the communication device 20a among the data D is also notified to the communication device 20b. Thus, for instance, the transmission unit 35a may generate packet TD1 illustrated in FIG. 8. In the example of packet TD1, the hash value H of the data D is also included in addition to the data D and the address information of the division data held in the communication device 20a. However, when the communication device 20b on the receiving-side calculates a hash value, the hash value does not have to be included in the transmission packet. In order to facilitate visualization of figures, the payload portion of the packet TD1 is illustrated. However, the packet TD1 includes a header or the like as appropriate. The transmission unit 35a transmits the generated packet TD1 to the communication device 20b via the communication unit 21a.

The communication unit 21b of the communication device 20b receives the packet TD1. The reproduction processing unit 36b determines whether the hash value included in the packet TD1 is included in the cache 41b. It is assumed that when the communication device 20b receives the packet TD1, the hash value H or information associated with the hash value H is not included in the cache 41b. The reproduction processing unit 36b then does not perform reproduction for the data included in the packet TD1. The reproduction processing unit 36b outputs the data in the packet TD1 in accordance with the setting previously made. For example, when the received data is processed in the communication device 20b, the reproduction processing unit 36b may output the data D to an application processing unit (not illustrated) in the communication device 20b. When the terminal 10 is connected to the communication device 20, and an application is running on the terminal 10, the reproduction processing unit 36b transmits the data to the terminal 10 via the communication unit 21b.

The storage processing unit 34b obtains the address of the part held in the communication device 20a among the data D. The storage processing unit 34b recognizes the part not held in the communication device 20a among the data D as the target to be held in the communication device 20b. In the example of FIG. 8, the early 50% (D(1-50)) of the data D is held in the communication device 20a, thus the storage processing unit 34b recognizes that the late 50% (D(51-100)) of the data D is requested to be held in the communication device 20b. Thus, the storage processing unit 34b stores the late 50% of the data D, and the address information of division data D(51-100) in the cache 41b in association with the hash value (H) of the data D. Thus, the information indicated by a cache 41b-1 is recorded in the communication device 20b.

The storage processing unit 34b may record, in the duplication counter 42, information indicating that data is transmitted and received to and from the data D. When the number of transmission processing of data is also recorded on the receiving-side, the communication device 20 of each of the transmitting-side and the receiving-side includes a different duplication counter 42 for each opposing device.

(2) Second Data Transmission

Next, an example of processing when the data D is transmitted from the communication device 20a to the communication device 20b for the second time will be described.

The duplication determining unit 31a determines that the hash value of the data D is recorded in the cache 41a, and obtains the number of transmission processing of the data D from the duplication counter 42a-1. Since the data D is already transmitted once, the duplication determining unit 31a recognizes that the current transmission processing is the second time. The division size determining unit 32a determines whether the number of transmission processing of the data D exceeds the number P of transmissions used for adjustment of the volume of data to be held. It is assumed that the number P of transmissions used for adjustment of the volume of data to be held is three. Since the current transmission is the second data transmission, the number of transmission processing does not exceed the number P of transmissions used for adjustment of the data volume. Thus, the division size determining unit 32a determines to adjust the volume of data to be stored in the communication device 20a and the communication device 20b by the current transmission and reception processing. The division size determining unit 32a calculates a variation amount in the size of the data to be stored in the communication device 20a using Expression (1).

$$\text{Variation Amount } (\%) = \left(IR_s - \frac{V_s}{V_s + V_r}\right) * 100 / P \qquad (1)$$

In Expression (1), IRs indicates a proportion of the volume of the data stored in the communication device 20 on the transmitting-side for the first transmission to the entire volume of the data to be processed. Vs is the maximum value of data storable in the communication device 20 on the transmitting-side, and Vr is the maximum value of data storable in the communication device 20 on the receiving-side. P is the number of transmissions used for adjustment of the volume of data to be held.

In the example of FIG. 8, at the first transmission of the data D, the communication device 20a on the transmitting-side holds 50% of the data D. For instance, it is assumed that the maximum value of data storable in the communication device 20a is half the maximum value of data storable in the communication device 20b. Since Vs is ½ of Vr, Vs/(Vs+Vr)=⅓. In the example of FIG. 8, the number P of transmissions used for adjustment of the volume of data to be held is three, thus the variation amount may be calculated from Expression (1) as follows.

$$\text{Variation Amount } (\%)=(0.5-\frac{1}{3})\times 100/3 \approx 8\% \qquad (2)$$

The division size determining unit 32a holds the obtained variation amount in association with the hash value of the data as appropriate.

The division size determining unit 32a determines the size of the data to be held in the communication device 20a and the size of the data to be held in the communication device 20b for the second transmission processing using the obtained variation amount. In the example of FIG. 8, the proportion of the data initially held in the communication device 20a to the data D is 50%, and the variation amount is 8%. The maximum value of the data storable in the communication device 20a is smaller than the maximum value of the data storable in the communication device 20b. Thus, for the second transmission processing, the data division size determining unit 32a decreases the data to be held in the communication device 20a by 8% which is the variation amount, that is, changes from the early 50% of the data D to 42% of the data from the head. Along with the variation in the volume of the data to be held in the communication device 20a, the division size determining unit 32a increases the data to be held in the communication device 20b by 8%, that is, changes the late 50% of the data D to 58% on the end side of the data. The division size determining unit 32a notifies the division processing unit 33a and the transmission unit 35a of the determined proportion.

The division processing unit 33a divides the data D into division data D(1-42) and division data D(43-100) in accordance with the notification from the division size determining unit 32a. The division data D(1-42) is 42% data from the head of the data D, and the division data D(43-100) is the data following the 42% data from the head of the data D.

The transmission unit 35*a* refers to the cache 41*a*-1, and recognizes that the communication device 20*a* holds the early 50% of the data D when communicating with the communication device 20*b*. The transmission unit 35*a* determines to transmit, to the communication device 20*b*, the early 50% of the data D and address information indicating that the transmission target data is the early 50% of the data D. The transmission unit 35*a* also determines to transmit the address information of the data held in the communication device 20*a*, which corresponds to the proportion notified from the division size determining unit 32*a*, and the hash value H of the data D. Therefore, for instance, the transmission unit 35*a* may generate a packet TD2 illustrated in FIG. 8 as the packet to be transmitted for the second transmission of the data D. Similarly to the packet TD1, the packet TD2 includes a header or the like as appropriate. The transmission unit 35*a* transmits the generated packet TD2 to the communication device 20*b* via the communication unit 21*a*.

The storage processing unit 34*a* records the number of transmission processing of the data D in the duplication counter 42*a*. Thus, the duplication counter 42*a* of the communication device 20*a* is updated as illustrated in the duplication counter 42*a*-2. Storage processing unit 34*a* holds the data to be held in the communication device 20*a* among the data D in association with the hash value of the data before division, and the address information of the data to be held. Thus, the information indicated by cache 41*a*-2 is stored in the cache 41*a* of the communication device 20*a* by the processing of the storage processing unit 34*a*. For example, the division data D(1-42) for 42% data from the head of the data D, and the address information (1-42) are stored in the cache 41*a* in association with the hash value H of the data D.

Next, the processing in the communication device 20*b* will be described. The communication unit 21*b* of the communication device 20*b* receives the packet TD2. The reproduction processing unit 36*b* determines whether the hash value included in the packet TD2 is included in the cache 41*b*-1. When the communication device 20*b* receives the packet TD2, the hash value H or information associated with the hash value H is included in the cache 41*b*-1. The reproduction processing unit 36*b* then reproduces the data D by connecting the data included in the packet TD2 and the data included in the cache 41*b*-1 in the order associated with the address information of each data. For example, the reproduction processing unit 36*b* may reproduce the data D by generating data in which D(51-100) held in the cache 41*b*-1 is connected to the end of the data D (1-50) included in the packet TD2. The reproduction processing unit 36*b* outputs the reproduced data D to a predetermined output destination. For example, when the data D is processed in the communication device 20*b*, the reproduction processing unit 36*b* may output the data D to an application processing unit (not illustrated) in the communication device 20*b*. When the terminal 10 is connected to the communication device 20, and an application is running on the terminal 10, the reproduction processing unit 36*b* transmits the data D to the terminal 10 via the communication unit 21*b*.

The storage processing unit 34*b* obtains the address of the part held in the communication device 20*a* among the data D from the packet TD2. The storage processing unit 34*b* recognizes the part not held in the communication device 20*a* among the data D as the target to be held in the communication device 20*b*. In the example of FIG. 8, 42% (D(1-42)) from the head of the data D is held in the communication device 20*a*, thus the storage processing unit 34*b* recognizes that the data (D(43-100)) following the 42% data from the head of the data D is requested to be held in the communication device 20*b*. Thus, the storage processing unit 34*b* stores the division data D(43-100) and the address information of the division data D(43-100) in the cache 41*b* in association with the hash value (H) of the data D. Therefore, the cache 41*b*-1 in the communication device 20*b* is updated as illustrated in a cache 41*b*-2.

(3) Third Data Transmission

An example of processing when the data D is transmitted from the communication device 20*a* to the communication device 20*b* for the third time will be described with reference to FIG. 9.

The duplication determining unit 31*a* determines that the hash value of the data D is recorded in the cache 41*a*-2, and obtains the number of transmission processing of the data D from the duplication counter 42*a*-2. Since the data D is already transmitted twice, the duplication determining unit 31*a* recognizes that the current transmission processing is the third time. The division size determining unit 32*a* determines whether the number of transmission processing of the data D exceeds the number P of transmissions used for adjustment of the volume of data to be held. Since P=3 in the example of FIG. 9, the division size determining unit 32*a* determines to adjust the volume of data to be held between the communication device 20*a* and the communication device 20*b*. The division size determining unit 32*a* then determines the size of the data to be held in the communication device 20*a*, and the size of the data to be held in the communication device 20*b* for the third transmission processing using the variation amount determined for the second data transmission.

In the example of FIG. 9, the communication device 20*a* holds 42% from the head of the data D. As described with reference to FIG. 8, the volume of the data to be held in the communication device 20*a* is decreased by 8% by single variation processing. Thus, the division size determining unit 32*a* changes the data to be held in the communication device 20*a* to 34% from the head of the data D for the third transmission processing. Along with the variation in the volume of the data to be held in the communication device 20*a*, the division size determining unit 32*a* changes the data to be held in the communication device 20*b* to 66% on the end side of the data. The division size determining unit 32*a* notifies the division processing unit 33*a* and the transmission unit 35*a* of the determined proportion.

The division processing unit 33*a* divides the data D into division data D(1-34) and division data D(35-100) in accordance with the notification from the division size determining unit 32*a*. The division data D(1-34) is 34% data from the head of the data D, and the division data D(35-100) is the data following the 34% data from the head of the data D.

The transmission unit 35*a* refers to the cache 41*a*-2, and recognizes that the communication device 20*a* holds 42% from the head of the data D when communicating with the communication device 20*b*. The transmission unit 35*a* determines to transmit the 42% from the head of the data D along with the address information and the hash value of the data D to the communication device 20*b*. The transmission unit 35*a* further determines to transmit the information on the proportion of data to be held in the communication device 20*a* among the proportions notified from the division size determining unit 32*a*. Therefore, the transmission unit 35*a* may generate a packet TD3 illustrated in FIG. 9 as the packet to be transmitted for the second transmission of the data D. Similarly to the packet TD1, the packet TD3 includes a header or the like as appropriate. The transmission unit 35*a* transmits the generated packet TD3 to the communication device 20*b* via the communication unit 21*a*.

Subsequently, similarly to the second transmission of the data D, the storage processing unit 34*a* performs update processing on the duplication counter 42*a* and the cache 41*a*. The duplication counter 42*a* of the communication device 20*a* is changed to a duplication counter 42*a*-3 by the processing as illustrated in FIG. 9. The information indicated by a cache 41*a*-3 is stored in the cache 41*a* of the communication device 20*a*.

Next, the processing in the communication device 20*b* will be described. The processing in the communication device 20*b* is similar to the processing when the communication device 20*b* receives the data D for the second time. The reproduction processing unit 36*b* of the communication device 20*b* receives the packet TD3 via the communication unit 21*b*. Since the hash value included in the packet TD3 is included in the cache 41*b*-2, the reproduction processing unit 36*b* reproduces the data D from the data included in the packet TD3 and the data included in the cache 41*b*-2. Subsequently, the reproduction processing unit 36*b* outputs the reproduced data D to the predetermined output destination.

The storage processing unit 34*b* obtains the address of the part held in the communication device 20*a* among the data D. The storage processing unit 34*b* stores the part not held in the communication device 20*a* among the data D in the cache 41*b* as the data to be held in the communication device 20*b*. In the example of FIG. 9, 34% (D(1-34)) from the head of the data D is to be held in the communication device 20*a*. Thus, the storage processing unit 34*b* stores division data (D(35-100)) following the 34% data from the head of the data D, and the address information of the division data D(35-100) in the cache 41*b* in association with the hash value (H) of the data D. As a consequence, the cache 41*b*-2 in the communication device 20*b* is updated as illustrated in a cache 41*b*-3.

(4) the Case where the Number of Transmission Processing Exceeds the Number P of Transmissions Used for Adjustment of Data Volume When the data D is transmitted from the communication device 20*a* to the communication device 20*b* for the fourth time and after, the division size determining unit 32*a* of the communication device 20*a* on the transmitting-side determines that the number of transmission processing exceeds the number P of transmissions used for adjustment of data volume. Therefore, the division size determining unit 32*a* determines that the data volume is not changed for the fourth time and after. Thus, the transmission unit 35*a* transmits, to the communication device 20*b*, a packet including 34% (D(1-34)) from the head of the data D as recorded in the cache 41*a*-3, the address information of the 34% data D(1-34), and the hash value of the data D.

Similarly to the third transmission processing, the communication device 20*b* performs reproduction processing. The storage processing unit 34*b*, when recognizing that the proportion of data held in the communication device 20*a* to the data D has not varied based on the information in the received packet and the information of the cache 41*b*-3, ends the reproduction processing without updating the cache 41*b*-3.

The processing which has been described with reference to FIGS. 8 and 9 is an example, and the processing may be changed depending on implementation. For example, the communication device 20 on the transmitting-side may calculate a variation amount whenever transmission processing of data is performed. The number P of transmissions used for adjustment of data volume, and the volume of data initially held in the communication device 20 on the transmitting-side may be changed freely.

Figure 10:
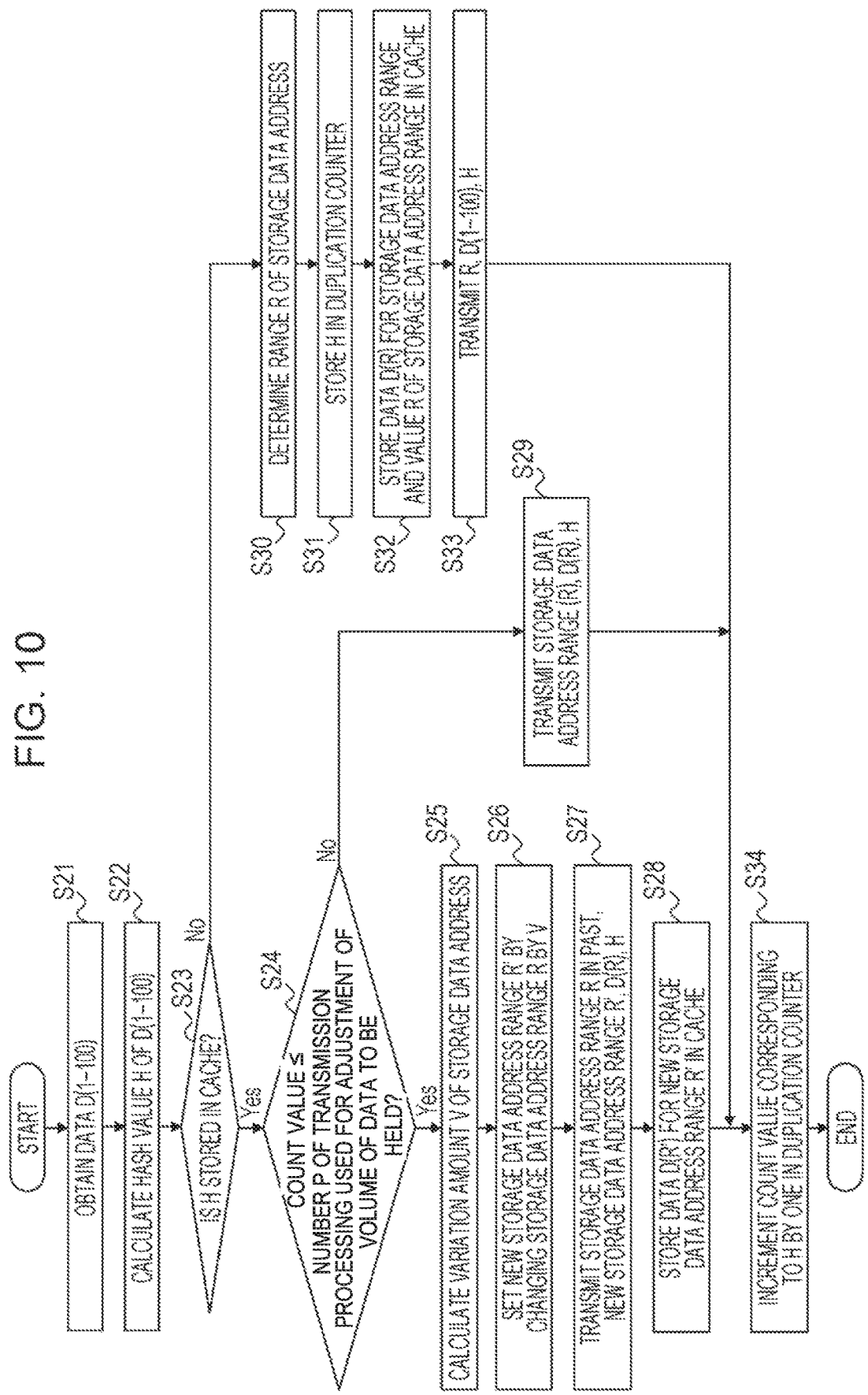
FIG. 10 is a flowchart illustrating an example of a transmission process.

FIG. 10 is a flowchart illustrating an example of a transmission process. The duplication determining unit 31 obtains transmission data D(1-100) (step S21). When the communication device 20 itself processes an application or the like, the duplication determining unit 31 may obtain transmission data generated by the processing in the communication device 20. When the terminal 10 is connected to the communication device 20, and an application is running on the terminal 10, the duplication determining unit 31 may obtain transmission data from the terminal 10. The duplication determining unit 31 calculates the hash value H of the data D(1-100) as the information to identify the data D(1-100) to be transmitted (step S22). The duplication determining unit 31 determines whether the hash value H is included in the cache 41 (step S23).

When the hash value H is not included in the cache 41, the division size determining unit 32 determines a range (storage data address range) R of address of the data to be held in the communication device 20 on the transmitting-side (No in step S23, step S30). The storage processing unit 34 stores the hash value H in the duplication counter 42 (step S31). In step S31, the hash value H is associated with the number (=0) of transmission processing. The storage processing unit 34 further stores data (D(R)) corresponding to the storage data address range, and the value R of the storage data address range in the cache 41 (step S32). Subsequently, the transmission unit 35 transmits, to the communication device 20 at a transmission destination via the communication unit 21, a packet including the storage data address range R, transmission target data D(1-100), and the hash value H of the transmission target data (step S33). Subsequently, the storage processing unit 34 increments a count value corresponding to the hash value H by one in the duplication counter 42, and completes the processing (step S34).

When the hash value H of the transmission target data is included in the cache 41, the division size determining unit 32 determines whether the count value is less than or equal to the number P of transmissions used for adjustment of the volume of data to be held (Yes in step S23, step S24). When the count value is less than or equal to the number P of transmissions used for adjustment of the volume of data to be held, the division size determining unit 32 calculates a variation amount V in the storage data address (Yes in step S24, step S25). The division size determining unit 32 sets a new storage data address range R' by changing the storage data address range R by the variation amount V in the storage data address (step S26). The communication unit 21 transmits the old storage data address range R in the past, the data D(R) corresponding to the old storage data address range R, the hash value H of the transmission target data, and the new storage data address range R' to the communication device 20 at a transmission destination (step S27). The storage processing unit 34 stores the data D(R') corresponding to the new storage data address range R' in the cache 41 (step S28). Subsequently, the storage processing unit 34 increments the count value corresponding to the hash value H by one in the duplication counter 42, and completes the processing (step S34).

When the count value exceeds the number P of transmissions used for adjustment of the volume of data to be held, the range of the storage data address is not changed (No in step S24). Thus, the transmission unit 35 transmits a packet to the communication device 20 at a transmission destination via the communication unit 21, the packet including the storage data address range R, the held data D(R), and the hash value H of the transmission target data (step S29). Subsequently, the processing in step S34 is performed.

The processing in FIG. 10 is an example. For example, the order of steps S31 to S33 may be changed freely. As described with reference to FIGS. 8 and 9, when the variation amount calculated in step S25 in the transmission processing for the second time is stored in the communication device 20 on the transmitting-side, the processing in step S25 may be skipped in the transmission processing for the third time and after. In the determination in step S23, instead of determining whether the hash value is recorded in the cache 41, the duplication determining unit 31 may determine whether the hash value is recorded in the duplication counter 42.

Figure 11:
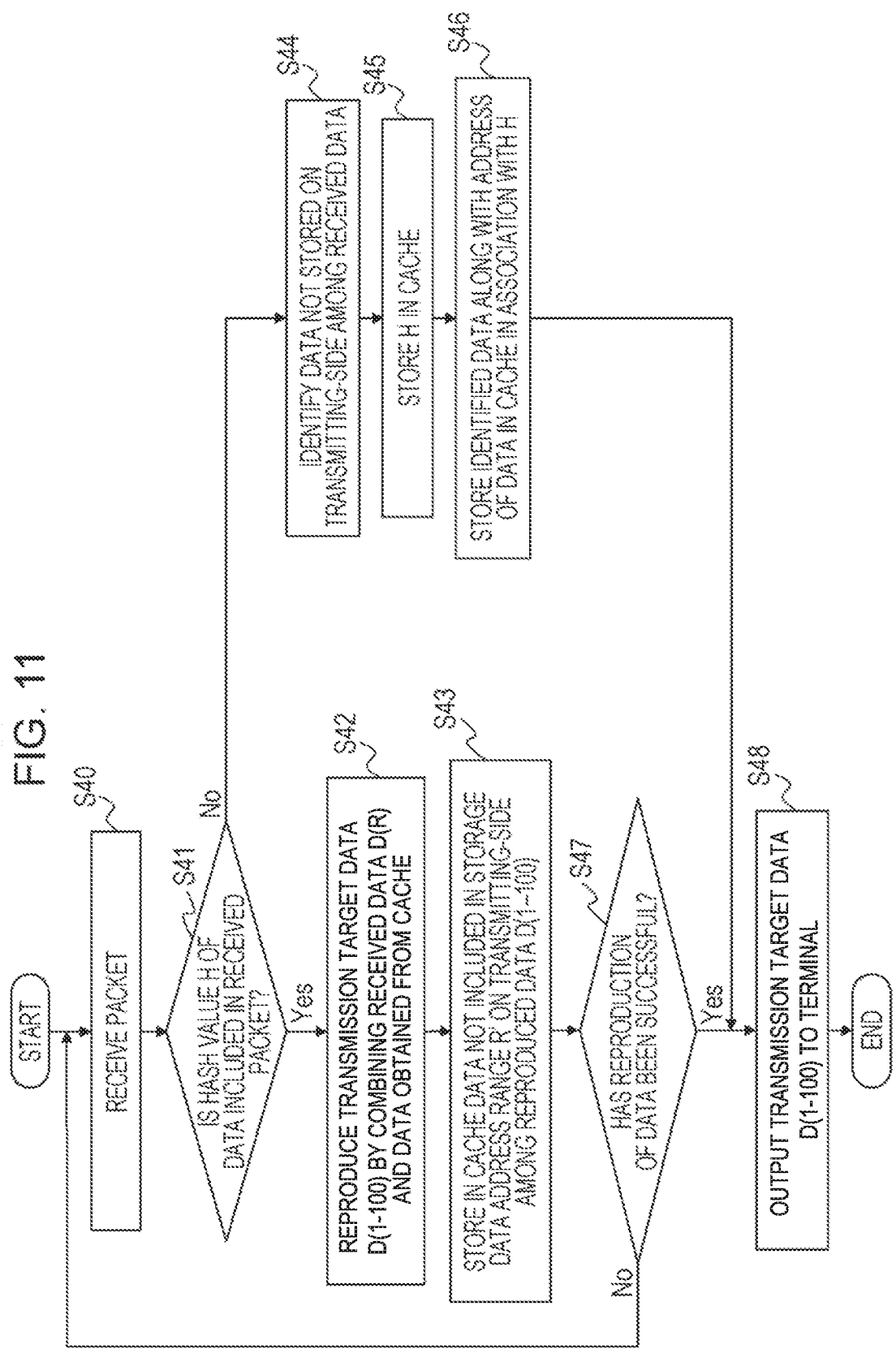
FIG. 11 is a flowchart illustrating an example of a reception process.

FIG. 11 is a flowchart illustrating an example of reception process. FIG. 11 is an example of processing in the case where the entire data is transmitted and the hash value of the data is not included in a packet. In the example of FIG. 11, an application is running on the terminal 10, thus the data reproduced by the communication device 20 is transmitted to the terminal 10.

The communication unit 21 receives a packet (step S40). The reproduction processing unit 36 determines whether the hash value of the data is included in the received packet (step S41). When the hash value of the data is not included in the received packet, the transmission is for the first time and the entire data (D(1-100)) is transmitted (No in step S41). The storage processing unit 34 identifies the data not stored in the communication device 20 on the transmitting-side among the received data (step S44). The storage processing unit 34 calculates the hash value H of the received data, and stores the obtained hash value H in the cache 41 (step S45). The storage processing unit 34 stores the identified data along with the address of the identified data in the cache 41 in association with the hash value H (step S46). Subsequently, the communication unit 21 outputs the transmission target data D(1-100) to the terminal 10 connected to the communication device 20 (step S48).

When the hash value of the data is included in the received packet, transmission target data is already transmitted and received in the past by the device itself (Yes in step S41). The reproduction processing unit 36 obtains the data associated with the hash value H from the cache 41, and combines the received data D(R) and the data obtained from the cache 41 to reproduce the transmission target data D(1-100) (step S42). The storage processing unit 34 stores, in the cache, the data not included in the storage data address range R' on the transmitting-side, among the reproduced transmission target data D(1-100) (step S43). Subsequently, the reproduction processing unit 36 determines whether reproduction of the data is successful (step S47). When the data is successfully reproduced, the communication unit 21 outputs the transmission target data D(1-100) to the terminal 10 connected to the communication device 20 (Yes in step S47, S48). When it is determined that the transmission target data is not successfully reproduced, the processing in step S40 and after is repeated (No in step S47).

Figure 12:
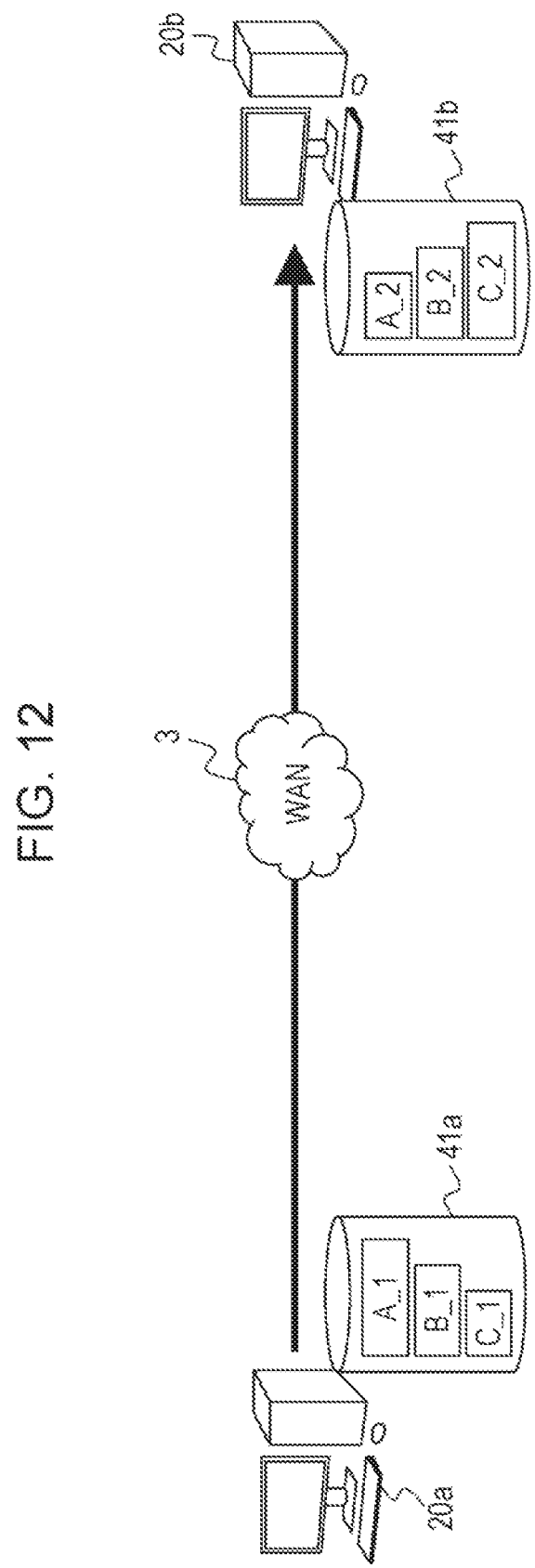
FIG. 12 is a diagram illustrating an example of adjustment of division size.

FIG. 12 is a diagram illustrating an example of adjustment of division size. In order to provide easy-to-understand description in FIGS. 8 to 11, the description has been given with attention focused to specific data. However, adjustment of division size may be made individually for multiple pieces of data. Thus, as illustrated in FIG. 12, when data A to C are transmitted from the communication device 20*a* to the communication device 20*b*, the communication device 20*a* on the transmitting-side determines the range of data to be held in the communication device 20*a* depending on the number of transmission processing. The communication device 20*a* on the transmitting-side holds the data determined to be held in communication device 20*a*, and notifies the communication device 20*b* on the receiving-side of the range for each data determined to be held in the communication device 20*a*. Thus, for each of data A to C, the communication device 20*b* on the receiving-side performs storage processing on the data in an address area for which corresponding data is not held in the communication device 20*a* on the transmitting-side.

For instance, it is assumed that the area usable for holding data in the communication device 20*a* is smaller than the area usable for holding data in the communication device 20*b* and that the data A, data B, and data C are in ascending order of the number of transmission processing. The communication device 20*a* increases the volume of data, among the data A, held in the communication device 20*b* stepwise, and decreases the volume of data held in the communication device 20*a* until the number of transmission processing reaches the number P of transmissions used for adjustment of the volume of data to be held. Since the number of transmission processing has not reached the number P of transmissions for the data A, the volume of division data A_1 held in the communication device 20*a* among the data A is larger than the volume of division data A_2 held in the communication device 20*b* among the data A.

It is assumed that the number of transmission processing of the data B has not reached the number P of transmissions, and is larger than the number of transmission processing of the data A. In this case, as illustrated in FIG. 12, the difference between the volume of division data B_1 held in the communication device 20*a* among the data B and the volume of division data B_2 held in the communication device 20*b* among the data B is smaller than the difference between division data A_1 and division data A_2.

For the data C, it is assumed that the number of transmission processing is larger than the number P of transmissions. Thus, the proportion of volumes of the data C held in the communication device 20*a* and the communication device 20*b* is optimized depending on the data volumes storable in the communication devices. Therefore, the ratio of division data C_1 held in the communication device 20*a* among the data C to division data C_2 held in the communication device 20*b* among the data C is the ratio of data volumes storable in the communication devices.

According to the second embodiment, the proportion of data volumes held in the devices may be changed depending on the data volume storable by each communication device 20. In the example described above, the data volume held in each device is optimized depending on the data volume storable by each device. However, the proportion of data held in the device on the transmitting-side and the device on the receiving-side and the method of determining the proportion may be changed freely depending on implementation.

Third Embodiment

In the first and second embodiments, an example of communication processing between two communication devices 20 has been described. However, in a third embodiment, the case will be described where each of three or more communication devices 20 holds part of the data, and performs communication processing.

Figure 13:
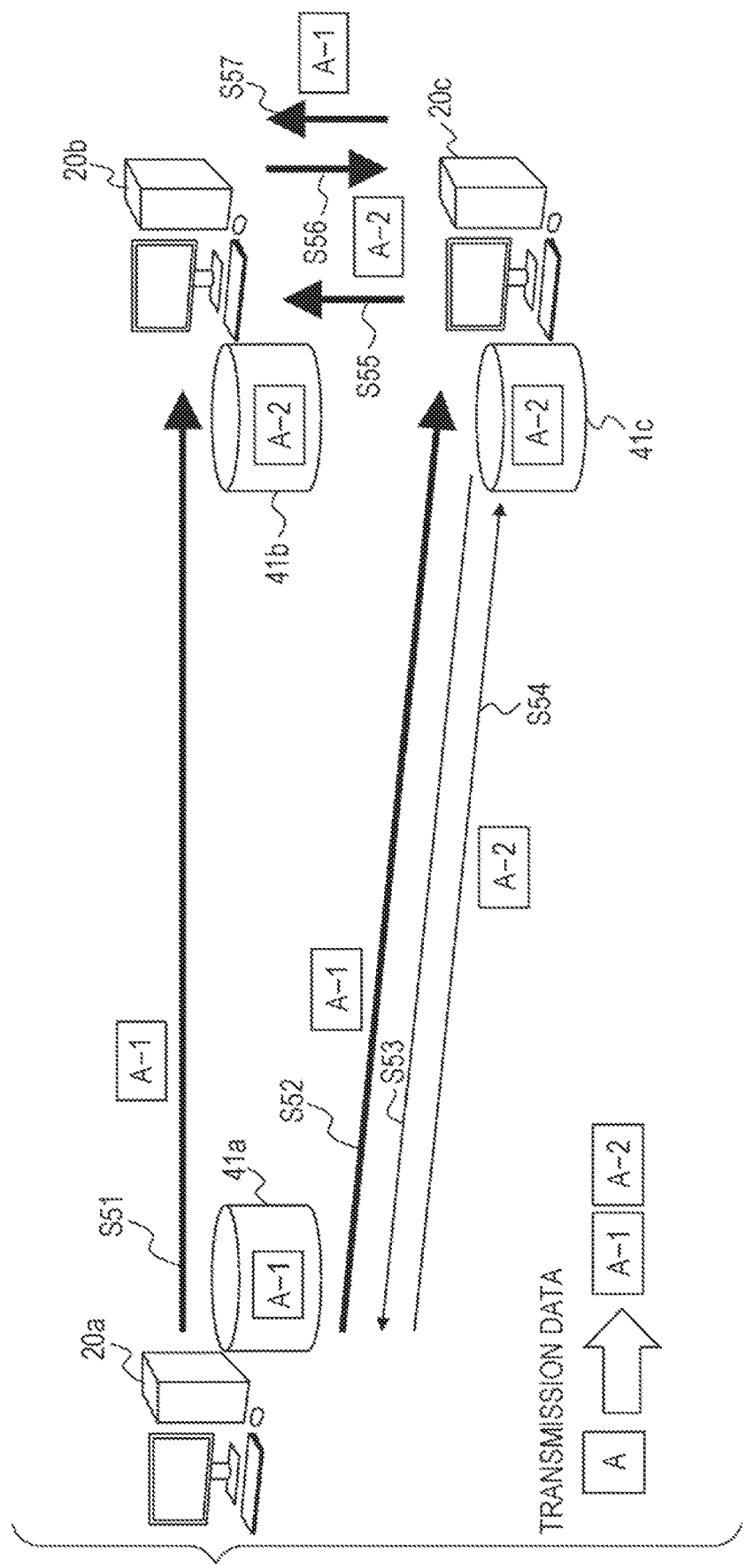
FIG. 13 is a diagram illustrating an example of communication processing performed by three communication devices.

FIG. 13 is a diagram illustrating an example of communication processing performed by three communication devices. The network illustrated in FIG. 13 includes communication devices 20a to 20c. In the third embodiment, when a communication device 20 on the receiving-side transmits a notification (completion notification) indicating completion of data acquisition to a communication device 20 on the transmitting-side upon successfully acquiring the transmission target data. It is assumed that the communication device 20 on the transmitting-side holds the transmission target data in an area of the storage unit 40 other than the cache 41 until completion notification is received from the communication device 20 on the receiving-side. Hereinafter, the third embodiment will be described separately for transmission of the data A from the communication device 20a to the communication device 20b, transmission of the data A from the communication device 20a to the communication device 20c, and transmission of the data A from the communication device 20c to the communication device 20b.

(1) Transmission of the Data a from the Communication Device 20a to the Communication Device 20b It is assumed that the communication device 20a transmits the data A for the first time. It is assumed that the division processing unit 33a of the communication device 20a divides the transmission target data A into division data A-1 and A-2 by processing similar to the processing described in the first embodiment. It is assumed that the storage processing unit 34a stores the division data A-1 and the address information of the division data A-1 along with the hash value of the data A in the cache 41a. The transmission unit 35a transmits, to the communication device 20b, a packet including the data A and information indicating that the communication device 20a holds the division data A-1.

The storage processing unit 34b in the communication device 20b stores the division data A-2 among the data A in the cache 41b as the information not held in the communication device 20a by processing similar to the processing in the first embodiment. A transmission unit 35b generates completion notification indicating that the data A is successfully received, and transmits the completion notification to the communication device 20a via the communication unit 21.

The communication unit 21a in the communication device 20a receives the completion notification. When the completion notification notifying of successful reception of the data A is received by the communication unit 21a, the duplication determining unit 31a deletes the data A held in a storage unit 40a.

Subsequently, when the communication device 20a transmits the data A to the communication device 20b again, similarly to the first embodiment, the duplication determining unit 31a obtains the data A, and recognizes that the hash value of the data A is included in the cache 41a. The duplication determining unit 31a stores the obtained data A in the storage unit 40a. Meanwhile, the transmission unit 35a transmits the hash value (hashA) of the data A held in the cache 41a, the division data A-1, and the address information of the division data A-1 to the communication device 20b (step S51). The reproduction processing unit 36b in the communication device 20b reproduces the data A using the division data A-1 in the received packet and the division data A-2 held in the cache 41b by processing similar to the processing in the first embodiment.

(2) Transmission of the Data a from the Communication Device 20a to the Communication Device 20c Next, when the communication device 20a also transmits the data A to the communication device 20c, the duplication determining unit 31a identifies that the hash value of the transmission target data A is included in the cache 41a. The transmission unit 35a transmits the hash value of the data A held in the cache 41a, the division data A-1, and the address information of the division data A-1 to the communication device 20c (step S52).

Since the hash value of the data A is included in the received packet, a reproduction processing unit 36c of the communication device 20c attempts to perform reproduction processing using the data included in the received packet. However, at the time of step S52, the hash value included in the received packet is not included in a cache 41c, thus the reproduction processing unit 36c fails to perform reproduction processing. The reproduction processing unit 36c stores, in the cache 41c, a combination of the division data A-1 and the hash value included in the received packet and generates a transmission request, which requests additional data transmission to the communication device 20c, in order to reproduce the data. The transmission request includes information usable for identifying the data to be transmitted by the additional data transmission. In the example of FIG. 13, is assumed that the transmission request includes the hash value of the data A, the address of the division data A-1 successfully received, and information indicating that information identified by the address is successfully received. The reproduction processing unit 36c transmits the transmission request to the communication device 20a via a communication unit 21c (step S53).

The transmission unit 35a in the communication device 20a receives the transmission request via the communication unit 21a. The transmission unit 35a identifies the data requested by the transmission request based on the hash value and the address included in the transmission request. In the case of the transmission request transmitted in step S53, it is notified that the hash value of the data A and the division data A-1 are successfully received. Then, the transmission unit 35a determines that data (the division data A-2) excluding the division data A-1 among the data A is not received by the communication device 20c. The transmission unit 35a generates a transmission packet including the hash value of the data A, the division data A-2, and the address of the part held in the communication device 20a among the data A. For example, the transmission unit 35a generates a transmission packet including the following information.

Hash value: hashA
Data: division data A-2
Address of the data held in the communication device 20a: A(1-50)

The transmission unit 35a transmits the generated packet to the communication device 20c via the communication unit 21a (step S54).

When receiving the packet via the communication unit 21c, the reproduction processing unit 36c of the communication device 20c reproduces the data A using the division data A-1 already obtained, and the division data A-2 included in the received packet. When reproduction processing is successfully performed, a storage processing unit 34c stores the part not stored in the communication device 20a among the reproduced data A in association with the hash value of the data A. Thus, as illustrated in FIG. 13, the division data A-2 is stored in the cache 41c by the processing of the storage processing unit 34c. Since reproduction processing is already successfully performed by receiving the packet in step S54, a transmission unit 35c generates completion notification indicating that the data A is successfully received, and transmits the completion notification to the communication device 20a via the communication unit 21c.

When the completion notification notifying of successful reception of the data A is received by the communication unit 21a, the duplication determining unit 31a in the communication device 20a deletes the data A held in the storage unit 40a.

(3) Transmission of the Data a from the Communication Device 20c to the Communication Device 20b At this time point, due to the processing in step S54, the cache 41c of the communication device 20c includes the hash value of the data A and the division data A-2. Thus, instead of the transmission target data A, the transmission unit 35c transmits the hash value of the data A, the division data A-2, and the address information of the division data A-2 to the communication device 20b (step S55).

Since the hash value of the data A is included in the received packet, the reproduction processing unit 36b of the communication device 20b attempts to perform reproduction processing using the data included in the received packet. However, the division data A-2, and the address information of the division data A-2 are already recorded in the cache 41b included in the communication device 20b in association with the hash value of the data A. The reproduction processing unit 36b obtains only the division data A-2 among the data A, thus reproduction processing is failed. Then, the reproduction processing unit 36b generates a transmission request, which requests additional data transmission to the communication device 20b, in order to reproduce the data. The transmission request generated here includes the following information.

Hash value: hashA
Address of successfully received data: A(51-100)

The reproduction processing unit 36b transmits a transmission request to the communication device 20c via the communication unit 21b (step S56).

The transmission unit 35c in the communication device 20c obtains the transmission request via the communication unit 21c. The transmission unit 35c identifies the data requested by the transmission request based on the hash value and the address included in the transmission request. In the case of the transmission request transmitted in step S56, it is notified that the hash value of the data A and the data corresponding to the part of A(51-100) is successfully received. Thus, the transmission unit 35c determines that data (the division data A-1) corresponding to the part of the data A excluding the A(51-100) is not received by the communication device 20b. Thus, the transmission unit 35c generates a transmission packet including the hash value of the data A, the division data A-1, and the address of the part stored in the communication device 20c among the data A. For example, the transmission unit 35c generates a transmission packet including the following information.

Hash value: hashA
Data: division data A-1
Address of the data held in the communication device 20c: A(51-100)

The transmission unit 35c transmits the generated packet to the communication device 20b via the communication unit 21c (step S57).

When obtaining a packet via the communication unit 21b, the reproduction processing unit 36b of the communication device 20b reproduces the data A using the division data A-2 held in the communication device 20b and the division data A-1 included in the received packet. Since part (the division data A-2) of the data A is held in the cache 41b in association with the hash value of the reproduced data A, the storage processing unit 34c does not update the information held in the cache 41b even if reproduction processing is successful. Since reproduction processing is already successfully performed by receiving the packet in step S57, the transmission unit 35b generates completion notification indicating that the data A is successfully received, and transmits the completion notification to the communication device 20c via the communication unit 21b.

When the completion notification notifying of successful reception of the data A is received by the communication unit 21c, a duplication determining unit 31c of the communication device 20c deletes the data A held in a storage unit 40c.

Figure 14:
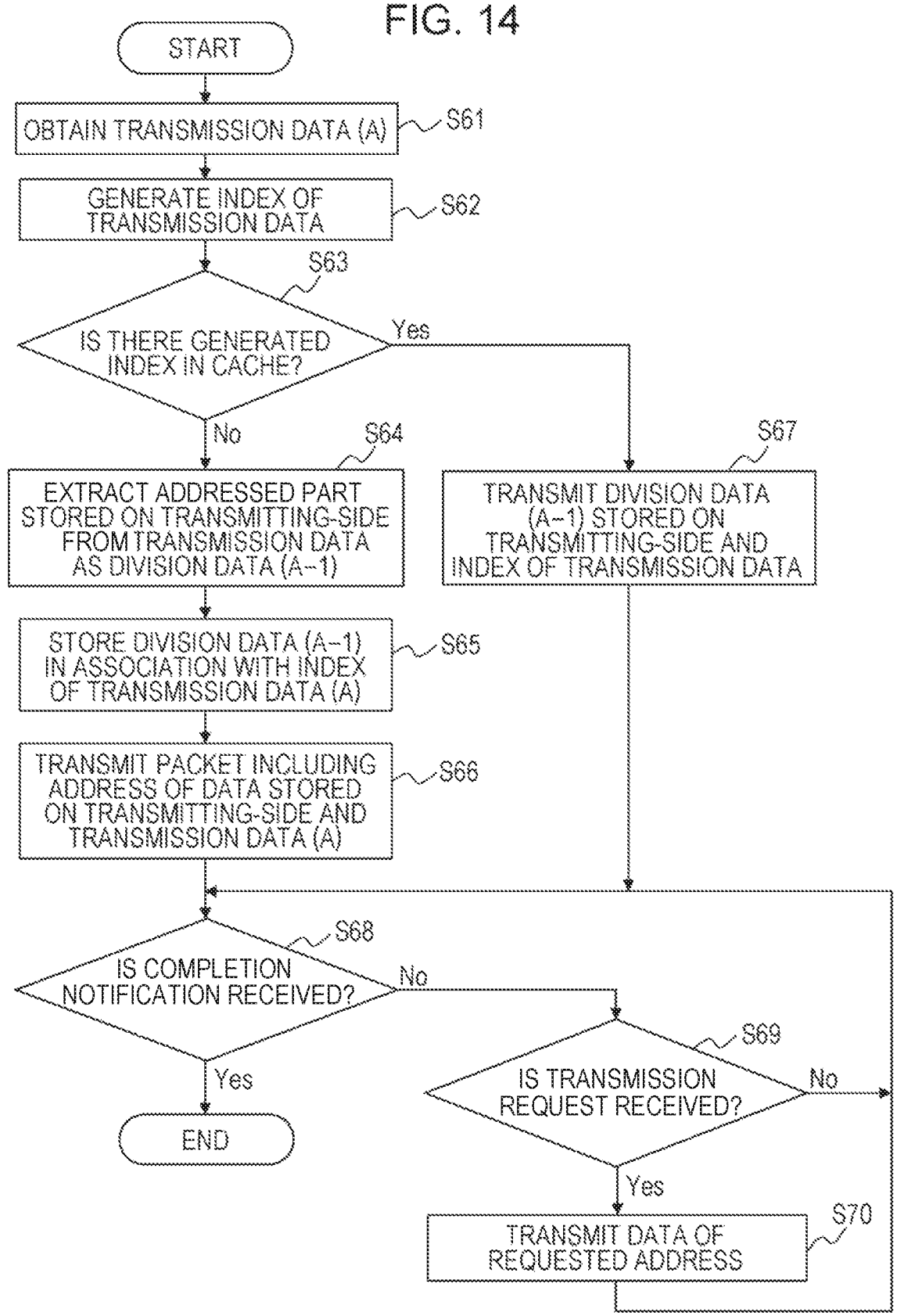
FIG. 14 is a flowchart illustrating an example of a transmission process.

FIG. 14 is a flowchart illustrating an example of transmission process in the third embodiment. The processing in steps S61 to S67 is similar to the processing in steps S1 to S7 which have been described with reference to FIG. 6.

The transmission unit 35 determines whether completion notification is received from the communication device 20 at the transmission destination (step S68). When completion notification is received from the communication device 20 at the transmission destination, the transmission unit 35 ends the processing (Yes in step S68).

When completion notification is not yet received from the communication device 20 at the transmission destination, the transmission unit 35 determines whether a transmission request is received from the communication device 20 at the transmission destination (No in step S68, step S69). When a transmission request is not yet received, the flow returns to step S68 (No in step S69). When a transmission request is already received, the transmission unit 35 transmits the data corresponding to the address requested by the transmission request, and the flow returns to step S68 (Yes in step S69, step S70).

Figure 15:
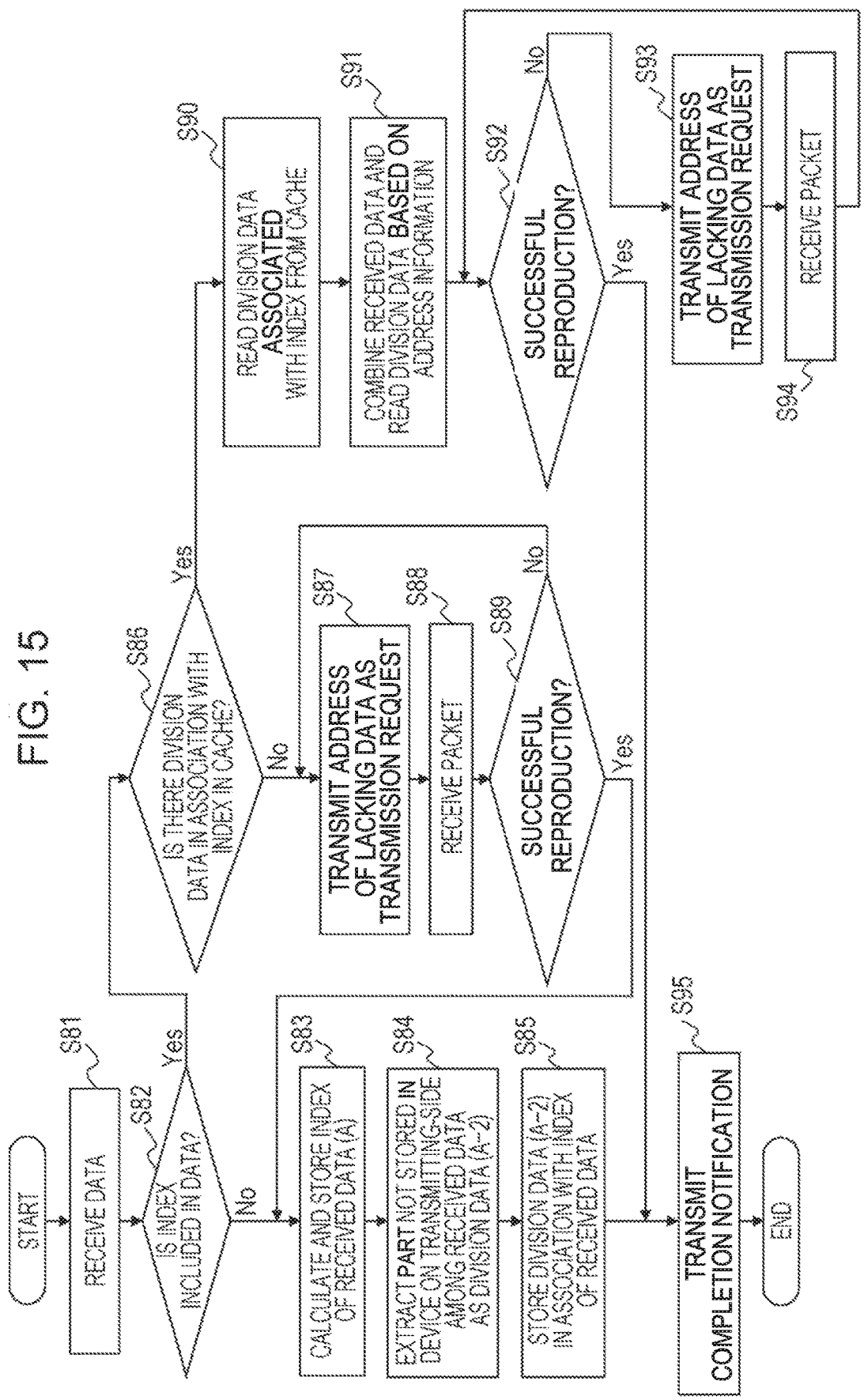
FIG. 15 is a flowchart illustrating an example of a reception process.

FIG. 15 is a flowchart illustrating an example of reception process. The processing in steps S81 to S85 is similar to the processing in steps S11 to S15 which have been described with reference to FIG. 7. Therefore, in steps S81 to S85, the communication device 20 on the receiving-side receives the entire transmission target data from the communication device 20 on the transmitting-side. Thus, after the processing in step S85, the transmission unit 35 transmits a completion notification to the communication device 20 at the data transmission source (step S95).

When an index is included in the received data, the reproduction processing unit 36 determines whether division data associated with the index is held in the cache 41 (Yes in step S82, step S86). When division data associated with the index is not held in the cache 41, the reproduction processing unit 36 transmits, as a transmission request, address information corresponding to lacking data to the communication device 20 at the data transmission source (No in step S86, step S87). Subsequently, the communication unit 21 receives a packet from the communication device 20 at the destination of the transmission request (step S88). The reproduction processing unit 36 then determines whether the data to be transmitted by the communication device 20 at the transmission source is successfully reproduced by using the data included in the packet obtained in step S88 (step S89). When the data to be transmitted by the communication device 20 at the transmission source is not successfully reproduced, the processing in step S87 and after is performed (No in step S89).

When the data to be transmitted by the communication device 20 at the transmission source is successfully reproduced, the communication device 20 on the receiving-side has obtained the transmission target data this time although part of the transmission target data is not held in the cache 41 (Yes in step S89). Thus, in order to hold part of the transmission target data in the cache 41 for preparation of communication for the next time and later, the processing in step S83 and after is performed (Yes in step S89, step S83).

Next, the processing when an index is included in the received data and division data associated with the index is held in the cache 41 will be described (Yes in step S82, Yes in step S86). In this case, the reproduction processing unit 36 reads the division data associated with the index from the cache 41 (step S90). The reproduction processing unit 36 combines the received data and the read division data based on the address information (step S91). The reproduction processing unit 36 determines whether the data to be transmitted by the communication device 20 at the transmission source is successfully reproduced by the processing in step S91 (step S92). When the data to be transmitted by the communication device 20 at the transmission source is not successfully reproduced, the reproduction processing unit 36 transmits, a transmission request, address information corresponding to lacking data to the communication device 20 at the data transmission source (No in step S92, step S93). Subsequently, the communication unit 21 receives a packet from the communication device 20 at the destination of the transmission request (step S94). The reproduction processing unit 36 then determines whether the data to be transmitted by the communication device 20 at the transmission source is successfully reproduced using the data included in the packet obtained in step S94 (step S92). When the data to be transmitted by the communication device 20 at the transmission source is not successfully reproduced, the processing in step S93 and after is performed (No in step S92). When the data to be transmitted by the communication device 20 at the transmission source is successfully reproduced, the transmission unit 35 transmits completion notification to the communication device 20 at the data transmission source (Yes in step S92, step S95).

In this manner, according to the third embodiment, each of three or more communication devices 20 holds part of data, and may perform communication processing while performing duplication processing utilizing the held data. Furthermore, when the data be transmitted and received is not reproduced from the data held in the communication device 20 on the transmitting-side and the data held in the communication device 20 on the receiving-side, the communication device 20 on the transmitting-side transmits division data, which has not been transmitted, in response to a request from the communication device 20 on the receiving-side. Thus, even when each communication device 20 does not manage the address information of the division data held in other communication devices 20, each of three or more communication devices 20 may perform duplication processing using the data held in the communication device 20. Thus, when the third embodiment is applied, deduplication may be efficiently performed using a result of communication performed by each communication device 20 with other communication devices 20.

Fourth Embodiment

In a fourth embodiment, the case will be described where communication using erasure correction coding is performed.

Figure 16:
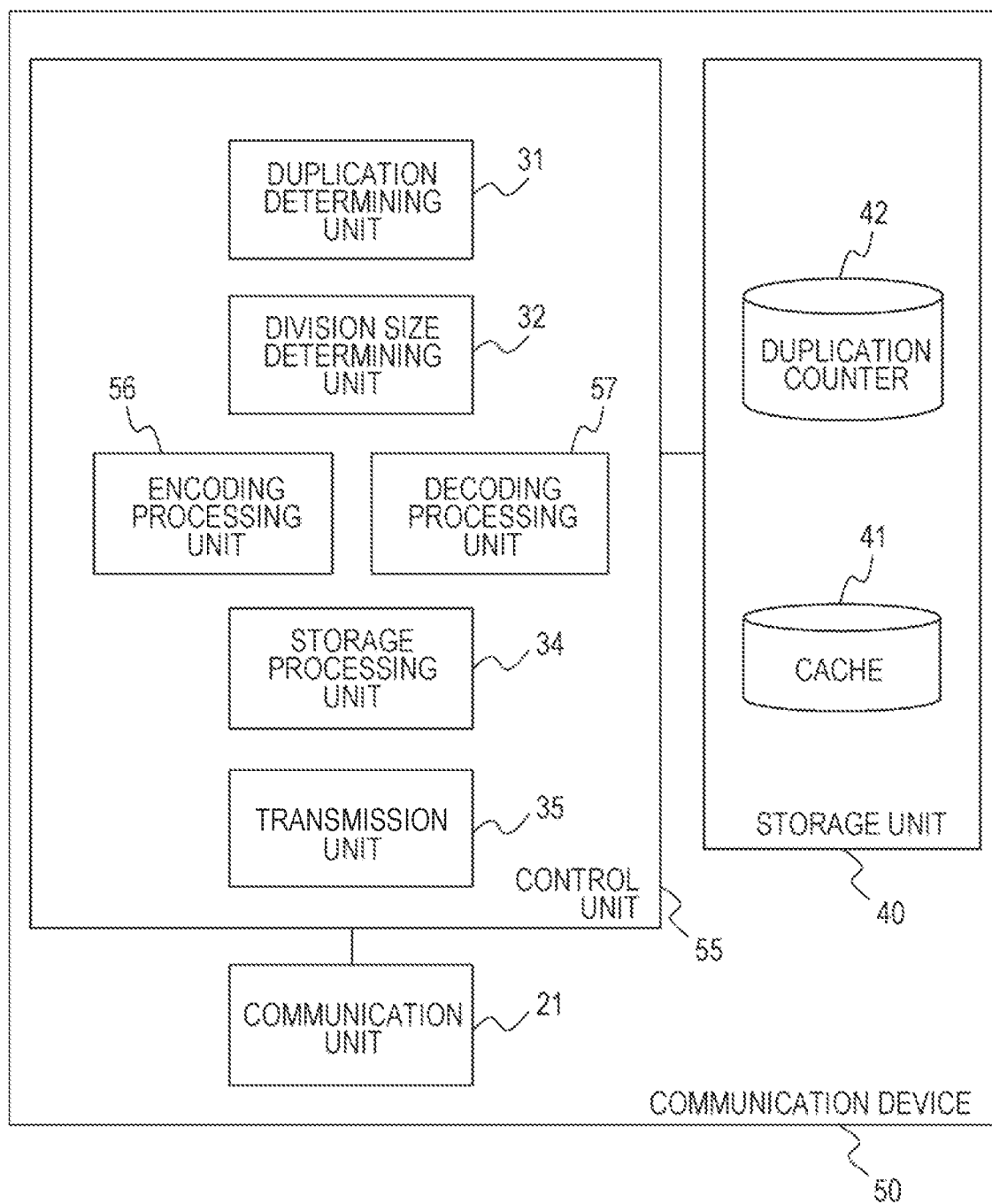
FIG. 16 is a diagram illustrating an exemplary configuration of a communication device according to a fourth embodiment.

FIG. 16 is a diagram illustrating an exemplary configuration of a communication device according to the fourth embodiment. A communication device 50 includes the communication unit 21, a control unit 55, and a storage unit 40. The control unit 55 includes a duplication determining unit 31, a division size determining unit 32, a storage processing unit 34, a transmission unit 35, an encoding processing unit 56, and a decoding processing unit 57. The storage unit 40 serves as a cache 41, and may include a duplication counter 42. Components other than the encoding processing unit 56 and the decoding processing unit 57 are similar to the components illustrated in FIG. 3.

The encoding processing unit 56 divides transmission target data based on the size determined by the division size determining unit 32, and encodes the data. The storage processing unit 34 records the division data encoded by the encoding processing unit 56 in the cache 41 in association with a hash value of the transmission target data. The transmission unit 35 determines to transmit the encoded division data included in the cache 41 as appropriate. When a packet including the encoded division data is received from another communication device 50, the decoding processing unit 57 reproduces the transmission target data using the encoded division data and the data held in the cache 41.

Similarly to other embodiments, when data with no transmission history is transmitted from a communication device 50 on the transmitting-side to a communication device 50 on the receiving-side, the entire transmission target data is transmitted to the communication device 50 on the receiving-side without performing encoding. However, the data held in the communication device 50 on the transmitting-side is stored in the cache 41 along with the hash value of the transmission target data in the form of a tally obtained by encoding. Also in the fourth embodiment, the communication device 50 on the transmitting-side notifies the communication device 50 on the receiving-side of address information usable for identifying the data held in the communication device 50 on the transmitting-side. Thus, the encoding processing unit 56 included in the communication device 50 on the receiving-side determines, using the address of the data held on the transmitting-side, the volume of data to be held in the communication device 50 on the receiving-side and encodes the data to be held in the communication device 50 on the receiving-side. At this point, as the data to be stored in the communication device 50 on the receiving-side, the encoding processing unit 56 may select the data not held in the communication device 50 on the transmitting-side, and part of the data held in the communication device 50 on the transmitting-side among the transmission target data. Since the encoded data is held on both the transmitting-side and the receiving-side, even when part of the data transmitted for the second time and later is missing, there is a case where the data may be reproduced.

For instance, it is assumed that 60% data from the head of the data A is encoded and stored in a communication device 50*a* on the transmitting-side. It is assumed that a communication device 50*b* on the receiving-side determines to hold part of the data held in the communication device 50*a* in addition to 40% data from the end of the data A, and encodes and holds 60% of the data A from the end. In this situation, there is a case, even when part of the data transmitted from the communication device 50*a* is missing, the communication device 50*b* may reproduce the data A by combining the encoded data held in the communication device 50*b* and the encoded data received from the communication device 50*a*.

The communication device 50 illustrated in FIG. 16 may have the hardware configuration as illustrated in FIG. 4. The network connection device 104 operates as the communication unit 21. The control unit 55 is implemented by the processor 101. The storage unit 40 is implemented by the memory 102.

FIG. 17 is a diagram illustrating an example of a method of generating tally information using erasure correction. The example of FIG. 17 illustrates the case where the transmission target data is divided into four pieces of division data, and eight types of encoded data are generated from a tally matrix each with 8 rows and 4 columns. Two different pieces of encoded data are used as a single piece of tally data.

In the example of FIG. 17, each encoded data is generated by calculating exclusive OR (XOR) between pieces of division data corresponding to elements having a value of 1 in the tally matrix. For instance, when the transmission target data is divided into 1 to 4 division data, the first encoded data included in tally A is exclusive OR between the first division data, the second division data, and the fourth division data. Similarly, the second encoded data included in the tally A is exclusive OR between the second division data and the third division data. The first encoded data included in tally B is exclusive OR between the first division data and the third division data. The second encoded data included in tally B is exclusive OR between the second division data, the third division data, and the fourth division data. The first encoded data included in tally C is exclusive OR between the first division data and the fourth division data. The second encoded data included in tally C is the second division data. The first encoded data included in tally D is the first division data. The second encoded data included in tally D is exclusive OR between the second division data and the fourth division data. These tallies are generated by the encoding processing unit 56 of the communication device 50 on the transmitting-side.

The decoding processing unit 57 reproduces the transmission target data by decoding the received data and the encoded data included in the cache 41. At this point, the decoding processing unit 57 reproduces the data by calculating exclusive OR between the tallies.

Similarly to the third embodiment, data may be transmitted and received between three communication devices 50 using tallies including the encoded data. When data is transmitted and received between three communication devices 50 using tallies, there may be a case where communication is performed without performing retransmission processing due to error correction using encoded data.

FIG. 18 is a diagram illustrating an example of communication processing between three communication devices 50a to 50c. For instance, it is assumed that data A is transmitted and received and that the communication device 50a transmits the data A to the communication device 50b along with notification indicating that the communication device 50a holds division data including 80% of the data A. For preparation of communication for the second time and later, the communication device 50a stores encoded data $a1_{\_80}$ obtained by encoding the division data including 80% of the data A in the cache 41a in association with the hash value of the data A.

An encoding processing unit 56b of the communication device 50b determines data to be held in the communication device 50b by combining the data not held in the communication device 50a and part of the data held in the communication device 50a among the data A. In the example of FIG. 18, it is assumed that the encoding processing unit 56b stores encoded data $a2_{\_80}$ including 80% of the data A in the cache 41b in association with the hash value of the data A.

After transmission of the data A to the communication device 50b, the communication device 50a is assumed to attempt to transmit the data A to the communication device 50c. In this case, encoded data $a1_{\_80}$ is transmitted to the communication device 50c by processing similar to the processing described with reference to FIG. 13. Although a decoding processing unit 57c of the communication device 50c attempts to decode the encoded data $a1_{\_80}$, reproduction of the data A fails because the encoded data $a1_{\_80}$ includes only 80% of the data A. Thus, similarly to the third embodiment, the transmission unit 35c requests additional data to the communication device 50a. When the data A is reproduced by the communication device 50c by receiving the additional data, an encoding processing unit 56c encodes data including the data not held in the communication device 50a among the data A, and stores the encoded data in the cache 41c. In the example of FIG. 18, it is assumed that the encoding processing unit 56c stores encoded data $a3_{\_40}$ including 40% of the data A in the cache 41c in association with the hash value of the data A.

In this manner, encoded data $a1_{\_80}$ is stored in the cache 41a of the communication device 50a, encoded data $a2_{\_80}$ is stored in the cache 41b of the communication device 50b, and encoded data $a3_{\_40}$ is stored in the cache 41c of the communication device 50c.

Subsequently, when the communication device 50a transmits the data A to the communication device 50b, the transmission unit 35a determines to transmit the encoded data $a1_{\_80}$ held in the cache 41a and the hash value of the data A (step S101). A decoding processing unit 57b of the communication device 50b then reproduces the data A using the encoded data $a2_{\_80}$ held in the cache 41b and the received encoded data $a1_{\_80}$.

When the communication device 50a transmits the data A to the communication device 50c, the transmission unit 35a determines to transmit the encoded data $a1_{\_80}$ and the hash value of the data A (step S102). In this case, the decoding processing unit 57c of the communication device 50c reproduces the data A using the encoded data $a3_{\_40}$ held in the cache 41c and the received encoded data $a1_{\_80}$.

Next, an example will be described where the communication device 50c transmits the data A to the communication device 50b. Similarly to the third embodiment, when the data A is transmitted, in the communication device 50c, the duplication determining unit 31c recognizes that the hash value of the data A and the encoded data $a3_{\_40}$ are held in the cache 41c. The transmission unit 35c then determines to transmit the encoded data $a3_{\_40}$ instead of the data A, thus the hash value of the data A and the encoded data $a3_{\_40}$ are transmitted to the communication device 50b (step S103).

The encoding processing unit 56b in the communication device 50b attempts to reproduce the data A using the encoded data $a2_{\_80}$ held in the cache 41b in association with the hash value of the data A, and the encoded data $a3_{\_40}$ included in the received data. Here, the encoded data $a2_{\_80}$ includes 80% of the data A, and the encoded data $a3_{\_40}$ includes 40% of the data A. Therefore, the encoding processing unit 56b may succeed in reproducing the data A using the encoded data $a2_{\_80}$ and the encoded data $a3_{\_40}$. If the encoding processing unit 56b succeeds in reproducing the data A from the encoded data transmitted in step S103 and the encoded data held in the cache 41b, the communication device 50b does not request transmission of additional data to the communication device 50c.

Thus, as illustrated in FIG. 18, in communication between three or more communication devices 50 using encoded data, retransmission processing from the communication device 50 on the transmitting-side may be omitted, as compared with the third embodiment. Thus, as in the fourth embodiment, the communication efficiency in a system including three or more communication devices 50 may be improved using erasure correction coding.

Other Embodiments

The embodiments are not limited to those described above, and may be modified in various manners. Some examples will be described below.

For instance, the cache 41 and the duplication counter 42 illustrated in the above description are examples, and may be changed depending on implementation. For example, information elements included in the cache 41 and the duplication counter 42 may be changed depending on implementation.

The tally matrix used for encoding processing is an example, and may be changed depending on implementation. In addition, the volume of data included in each tally and the proportion between the pieces of data held in communication devices 50 may also be changed depending on implementation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication device, comprising:
a memory; and
a processor coupled to the memory and the processor configured to:
extract first division data from transmission data when transmitting the transmission data;
store, as held data, the first division data in the memory in association with first identification information that identifies the transmission data;
transmit, to a communication destination, a first transmission packet including the transmission data and information that identifies the held data to cause the communication destination to store second division data which is not included in the held data, among the transmission data in association with the first identification information; and
transmit, when transmitting the transmission data after the transmission of the first transmission packet, a second transmission packet including the first identification information and the held data instead of the transmission data to the communication destination.

2. The communication device according to claim 1, wherein
the processor is further configured to:
extract, from the transmission data, third division data different from the first division data when transmitting the transmission data after the transmission of the first transmission packet; and
change the held data by storing the third division data instead of the first division data in the memory in association with the first identification information.

3. The communication device according to claim 2, wherein
the memory is further configured to hold a predetermined number of adjustments, and
the processor is further configured to:
withhold the change of the held data when a number of transmission processing of part of the transmission data to the communication destination exceeds the predetermined number of adjustments.

4. The communication device according to claim 1, wherein
the processor is further configured to:
receive a first reception packet including reception data and information that identifies a first part of the reception data;
store, in the memory, third division data corresponding to a second part different from the first part of the reception data in association with second identification information that identifies the reception data; and
reproduce, upon receiving a second reception packet including the second identification information and fourth division data after the reception of the first reception packet, the reception data using the fourth division data included in the second reception packet and the third division data held in the memory in association with the second identification information.

5. The communication device according to claim 1, wherein
the processor is further configured to:
encode the first division data using error correction coding;
store, as the held data, the encoded first division data in the memory in association with the first identification information; and
transmit, to the communication destination, the first transmission packet to cause the communication destination to store the second division data that is encoded using the error correction coding in association with the first identification information.

6. A communication system, comprising:
a first communication device including:
a first memory; and
a first processor coupled to the first memory; and
a second communication device including:
a second memory; and
a second processor coupled to the second memory,
wherein
the first processor is configured to:
extract first division data from transmission data when transmitting the transmission data;
store, as held data, the first division data in the first memory in association with first identification information that identifies the transmission data;
transmit, to the second communication device, a first transmission packet including the transmission data and information that identifies the held data; and
transmit, when transmitting the transmission data after the transmission of the first transmission packet, a second transmission packet including the first identification information and the held data instead of the transmission data to the second communication device, and
the second processor is configured to:
receive the first transmission packet: and
store, in the second memory, second division data which is not included in the held data among the transmission data in association with the first identification information.

7. The communication system according to claim 6, wherein
the second processor is further configured to:
reproduce, upon receiving the second transmission packet, the transmission data using the held data included in the second transmission packet and the second division data held in the second memory in association with the first identification information.

8. The communication system according to claim 6, wherein
the first processor is further configured to:
extract, from the transmission data, third division data different from the first division data when transmitting the transmission data after the transmission of the first transmission packet; and
change the held data by storing the third division data instead of the first division data in the first memory in association with the first identification information.

9. A non-transitory computer-readable recording medium having stored therein a program that causes a computer to execute a process, the process comprising:
extracting first division data from transmission data when transmitting the transmission data;
storing, as held data, the first division data in a memory in association with first identification information that identifies the transmission data;
transmitting, to a communication destination, a first transmission packet including the transmission data and information that identifies the held data to cause the communication destination to store second division data which is not included in the held data, among the transmission data in association with the first identification information; and
transmitting, when transmitting the transmission data after the transmission of the first transmission packet, a second transmission packet including the first identification information and the held data instead of the transmission data to the communication destination.

10. The non-transitory computer-readable recording medium according to claim 9, the process further comprising:
extracting, from the transmission data, third division data different from the first division data when transmitting the transmission data after the transmission of the first transmission packet; and
changing the held data by storing the third division data instead of the first division data in the memory in association with the first identification information.

11. The non-transitory computer-readable recording medium according to claim 10, the process further comprising:
withholding the changing of the held data when a number of transmission processing of part of the transmission data to the communication destination exceeds a predetermined number of adjustments.

12. The non-transitory computer-readable recording medium according to claim 9, the process further comprising:
receiving a first reception packet including reception data and information that identifies a first part of the reception data;
storing, in the memory, third division data corresponding to a second part different from the first part of the reception data in association with second identification information that identifies the reception data; and
reproducing, upon receiving a second reception packet including the second identification information and fourth division data after the reception of the first reception packet, the reception data using the fourth division data included in the second reception packet and the third division data held in the memory in association with the second identification information.

13. The non-transitory computer-readable recording medium according to claim 9, the process further comprising:
encoding the first division data using error correction coding;
storing, as the held data, the encoded first division data in the memory in association with the first identification information; and
transmitting, to the communication destination, the first transmission packet to cause the communication destination to store the second division data that is encoded using the error correction coding in association with the first identification information.

* * * * *